US007750801B2

(12) United States Patent
Culpepper et al.

(10) Patent No.: US 7,750,801 B2
(45) Date of Patent: Jul. 6, 2010

(54) METHOD AND SYSTEM FOR PROVIDING TRACKING SERVICES TO LOCATE AN ASSET

(75) Inventors: Jerry W. Culpepper, Garland, TX (US); Lawrence M. Smith, Lewisville, TX (US); James P. VanCleave, The Colony, TX (US)

(73) Assignee: Spectrum Tracking Systems, Inc., Carrollton, TX (US)

( * ) Notice: Subject to any disclaimer, the term of this patent is extended or adjusted under 35 U.S.C. 154(b) by 0 days.

(21) Appl. No.: 11/931,081

(22) Filed: Oct. 31, 2007

(65) Prior Publication Data
US 2008/0048856 A1 Feb. 28, 2008

Related U.S. Application Data

(63) Continuation of application No. 11/269,985, filed on Nov. 9, 2005, now Pat. No. 7,375,654, which is a continuation of application No. PCT/US2004/041906, filed on Dec. 14, 2004, and a continuation of application No. 11/011,445, filed on Dec. 14, 2004, now Pat. No. 7,138,914, which is a continuation-in-part of application No. 10/710,485, filed on Jul. 14, 2004, now Pat. No. 7,135,967.

(60) Provisional application No. 60/491,951, filed on Aug. 1, 2003, provisional application No. 60/491,952, filed on Aug. 1, 2003.

(51) Int. Cl.
*G08B 1/08* (2006.01)

(52) U.S. Cl. .............................. 340/539.13; 340/825.49
(58) Field of Classification Search ............. 340/539.1, 340/539.13, 539.11, 995.13, 825.49
See application file for complete search history.

(56) References Cited

U.S. PATENT DOCUMENTS

| 6,023,232 A * | 2/2000 | Eitzenberger ............... 340/988 |
| 6,339,745 B1 * | 1/2002 | Novik ......................... 701/208 |
| 6,377,210 B1 * | 4/2002 | Moore ..................... 342/357.13 |
| 6,509,830 B1 * | 1/2003 | Elliott ...................... 340/539.1 |
| 6,509,868 B2 * | 1/2003 | Flick ...................... 342/357.07 |

(Continued)

*Primary Examiner*—Eric M Blount
(74) *Attorney, Agent, or Firm*—Tucker Ellis & West LLP

(57) ABSTRACT

The present invention is directed to a method of asset location. Location data is received from a cellular transmitter associated with a selected asset, which location data includes data representative of a cellular receiver with which direct communication with the cellular transmitter is made. The location data is then communicated to a tracking service system, which tracking service system includes a database representative of geographic locations associated with a plurality of cellular receivers. The database is then queried with received location data so as to generate geographic tracking data associated with a location of the cellular receiver, the geographic tracking data including display data adapted to generate a map image including a representative of a location of the selected asset. The geographic tracking data is then communicated to an associated security agency so as to allow for viewing of an image generated in accordance with the display data and at least one of tracking and interception of the selected asset.

12 Claims, 18 Drawing Sheets

U.S. PATENT DOCUMENTS

| | | | |
|---|---|---|---|
| 6,801,129 B2 * | 10/2004 | Grimm | 340/568.7 |
| 6,838,998 B1 * | 1/2005 | Brown et al. | 340/825.49 |
| 6,847,892 B2 * | 1/2005 | Zhou et al. | 340/426.19 |
| 7,286,648 B1 * | 10/2007 | Chang et al. | 379/45 |
| 7,286,929 B2 * | 10/2007 | Staton et al. | 340/539.13 |
| 7,295,119 B2 * | 11/2007 | Rappaport et al. | 340/572.4 |
| 7,349,705 B1 * | 3/2008 | Holland | 455/456.1 |
| 2005/0248444 A1 * | 11/2005 | Joao | 340/426.13 |

* cited by examiner

METHOD AND SYSTEM FOR PROVIDING TRACKING SERVICES TO LOCATE AN ASSET

CROSS-REFERENCE TO RELATED APPLICATIONS

This application is a continuation U.S. patent application Ser. No. 11/269,985 filed on Nov. 9, 2005 now U.S. Pat. No. 7,375,654, which is a continuation of PCT/US04/41906, filed on Dec. 14, 2004, and U.S. patent application Ser. No. 11/011,445, filed Dec. 14, 2004 now U.S. Pat. No. 7,138,914, which is a continuation-in-part of U.S. patent application Ser. No. 10/710,485, filed Jul. 14, 2004 now U.S. Pat. No. 7,135,967, entitled "METHOD FOR LOCATING AN ASSET", which is related to PCT/US04/24632, filed Jul. 30, 2004, PCT/US04/24606, filed Jul. 30, 2004, U.S. patent application Ser. No. 10/710,487, filed Jul. 14, 2004, entitled "SYSTEM FOR TRACKING AND LOCATING AN OBJECT", which are derived from U.S. Provisional Application No. 60/491,951, filed Aug. 1, 2003 and U.S. Provisional Application 60/491,952 filed Aug. 1, 2003, the entirety of which are incorporated herein by reference.

BACKGROUND OF THE INVENTION

The present invention relates generally to tracking systems for tracking the location of valuable materials, persons, objects, and more particularly, but not limited, to the tracking of stolen articles, objects or missing persons through existing cellular network infrastructure, the global positioning system (GPS), WiFi networks, WiMax networks, and the like. The invention further relates to location and tracking systems and algorithms using a combination of directional vectors and signal strength estimates and location identifiers that are based on radio frequency transmissions. The invention also teaches a system for asset tracking that is less prone to render false positives so as to eliminate or lessen concerns for asset movements with acceptable or limited risks.

There are earlier location systems which make use of the constellation of global positioning satellites orbiting the earth. Such systems range from navigational aids to tracking devices. For example, there is a vehicle tracking and security system that allows immediate response in case of vehicle theft, an accident, vehicle breakdown, or other emergency. Guardian and tracking functions are provided through mobile units installed in hidden locations in vehicles to be monitored. The mobile units communicate with a control center. Preferably, the mobile unit provides vehicle theft and intrusion protection using an in-vehicle alarm and security system linked to the control center by a transceiver in the mobile unit. Also, a keypad or other human interface device is typically provided, allowing a vehicle driver or occupant to signal the control center that a particular type of assistance is needed. The vehicle's location may be automatically transmitted to the control center along with any automatic alarm signal or manually entered request, the location being precisely determinable anywhere in the world through use of Global Position System (GPS) information. The system provides continuous monitoring of a large number of vehicles for a broad range of status and emergency conditions over a virtually unlimited geographic area, also allowing manual communication of requests for assistance to that specific location.

Another example of the use of GPS to track the location of an automobile is an automatic vehicle location system that includes a radio positioning system receiver which receives GPS radio signals and includes a two-gimbaled gyroscope, which is used by a dead-reckoning positioning system. A controller determines position based upon the radio positioning system when the radio signals are available and upon dead-reckoning when the radio signals are not available. The dead-reckoning process is based upon a compensation factor, which is established in response to data received from the radio positioning system. The compensation factor acts as an adjustment to an inner gimbal angle to compensate for a minor drift away from level by the inner gimbal.

A further example is a method for detecting the position of a moving body in which the position of a moving body such as a vehicle can be detected with a high degree of precision. It is possible to perform data communication using radio waves between radio base stations and a vehicle capable of movement. Precise positions are stored in advance in the radio base stations. The radio base stations also include radio wave clocks that keep a common time. The radio base stations transmit radio waves containing this time information. The vehicle receives these radio waves and determines the difference between the received time information and the time provided by a clock in the vehicle, in order to detect the current position of the vehicle by calculating the distances between the vehicle and each of the radio base stations. Furthermore, it is also possible for the position of the mobile station to be calculated using a combination of information from the fixed station and information from GPS satellites. By employing this type of structure, it is possible to calculate the position of the mobile station even when it is not possible to calculate the position of the mobile station using the fixed stations alone or GPS satellites alone. Therefore, it is possible to find the position of the mobile station more accurately than when a conventional method is used.

There also exists a tracking device configured to resemble a stack of currency and represents a system for use in catching thieves. The device relates to the electronic tracking of cash stolen from a bank or other institution via an electronic signaling device placed within a stack of currency that transmits location information to the authorities as the cash is moved from location to location. The tracking device allows law enforcement officers to electronically monitor money stolen from a bank. The tracking device is sized to fit within a stack of currency in a teller's drawer or a bank's vault. When the tracking device is activated, it transmits a beacon signal that continuously runs for the duration of the battery. Thus, the tracking device would automatically send a signal to either fixed monitoring stations, such as antenna located on tall buildings, or to mobile monitoring stations, such as helicopters and/or police cars, allowing for continual tracking of the thief in possession of the stolen money. By knowing the location of the money, the police can track and apprehend the perpetrators. It is designed to be a circuit card smaller than a dollar bill and thin enough to be concealed between two sealed bills, thereby allowing it to be placed into a stack of money undetected. Further, the device is flexible and is able to be waterproofed, which will have no effect on its ability to be continually tracked, but would prevent someone from shorting out the device in liquid. Alternative embodiments allow variations of the tracking device to be placed within other objects of value. An alternative embodiment allows the tracking device to be automatically activated when it is taken past a certain point, e.g., an electronic fence, from where it is stored.

Furthermore, there are tracking systems for tracking the location of stolen articles, and more particularly, to disguised currency bundles for aiding law enforcement officials in apprehending thieves and recovering stolen monies. Such tracking is tracked by a tracking agency, which agency may work in concert with a law enforcement agency. In other situations, the functions of a tracking agency are undertaken by the law enforcement agency itself. Such system may include a security pack for assisting in the recovery of stolen monies, which includes a housing disguised as a bundle of currency bills, but containing a GPS receiver for receiving GPS signals from overhead satellites combined with a cellular phone transmitter (module), a microprocessor, antennae, and a battery. Following a bank robbery, the microprocessor activates the cellular phone transmitter to dial the telephone number of a central monitoring station. The microprocessor obtains location data from the GPS receiver and transmits the location data, along with identification information, to the central monitoring station. The security pack may also include a separate, conventional RF beacon transmitter for allowing authorities to home-in on the security pack within a large building or other structure, either after the GPS signals are lost, or after the location of the security pack is localized to a specific area or building.

All of the devices described above are implemented, or require for implementation, access to GPS or a custom radio network of receivers. This is an expensive requirement, increasing overall costs and the size of the devices. There is thus a need for a smaller, less expensive solution to tracking and aiding law enforcement officials in the recovery of lost or stolen articles or missing children while utilizing existing cellular telephone network infrastructure.

BRIEF SUMMARY OF THE INVENTION

In view of the aforementioned needs, there is contemplated a system, method, and device capable of being implemented using existing communications infrastructure to locate a missing, stolen, or lost item or person.

In accordance with the present invention, there is provided a system and method of coordinated asset location. Location data is received from a device, suitably a cellular, WiFi, WiMax, or other suitable transmitter associated with a selected asset, which location data includes data representative of a receiver with which direct communication with the transmitter is made. The location data is then communicated to a tracking service system, which tracking service system includes a database representative of geographic locations associated with a plurality of receivers. The database is then queried with received location data so as to generate geographic tracking data associated with a location of the receiver, the geographic tracking data including display data adapted to generate a map image including data representative of a location of the selected asset. The geographic tracking data is then communicated to an associated security agency or law enforcement agency so as to allow for viewing of an image generated in accordance with the display data and at least one of tracking and interception of the selected asset.

In one embodiment, updated location data is periodically received and communicated to the tracking service system, in order to generate updated geographic location data. The geographic location data is then communicated to the security agency, allowing the updated images representing the location of the asset to be viewed. In a preferred embodiment, a secondary tracking signal is received from a radio-frequency transmitter associated with the selected asset. The secondary tracking signal is then communicated to at least one associated tracking vehicle. This embodiment further includes the receiving tracking vehicle data from each associated tracking vehicle, which vehicle tracking data represents tracking vehicle location, tracking vehicle direction, tracking vehicle speed, or signal strength of a vehicle's received secondary tracking signal. The tracking data is then communicated to the security or other monitoring agency to allow for the viewing of updated images representing the location of each tracking vehicle.

Still further, in accordance with the present invention, there is provided an asset tracking management system and method. Device data is first received, representing properties of a plurality of asset tracking devices. The device data, representing the properties of the asset tracking devices is then displayed. Event data is then received, representing a tracking event associated with one of the asset tracking devices. This event data, representing the tracking event, is subsequently displayed. Device service data representing the maintenance history of the asset tracking devices is received and then displayed. Tracking data is then received, representing a temporal property corresponding to the tracking event. The tracking data corresponding to the temporal property is then displayed.

In a preferred embodiment, the device data includes identification data uniquely associated with each of the plurality of asset tracking devices, and asset association data, linked to device identification data, representing a particular asset associated with each respective device of the plurality. The event data associated with each event includes a unique event identifier associated with the event, and location data representing a location of an asset associated with the event. The device service data suitably includes data representative of an installation date of the device, and data representing a service period for the device.

Still further in accordance with the present invention, there is provided an asset tracking system and method. Location data is periodically received representing an updated location of a tracking device associated with an asset. Map data is then received and a map area is displayed, which map area is inclusive of the location. The map is periodically updated map in accordance with newly acquired location data. A user specifies a desired scale level for the displayed map and the user's input is thereafter received, selectively scaling in and scaling out of the displayed map. In addition, input from the associated user specifying a display of historic location data is received, as well as means for displaying historic and updated location data in accordance with received user input.

In a preferred embodiment, data representing at least one of speed and velocity of the tracking device is received and an indicator is displayed, the indicator being of at least one of speed and velocity of the tracking device in accordance with received data. Furthermore, audio data representing ambient sounds proximate to the tracking device is received, and selectively output via an associated speaker in accordance with a user specified instruction. At least one of the location data, map area, velocity data and speed data is selectively communicated to an associated law enforcement agency.

Further in accordance with the present invention, there is provided a system and method for asset tracking. Notification data is received, representing the commencement of an asset tracking operation during which a selected asset is tracked. A tracking elapsed time is then tracked and associated with the asset tracking operation. Event data is then received, representing a triggering event associated with the tracking operation. Candidate data is then received representing an individual associated with the selected asset being tracked. Next, the notification data, the event data and the candidate data are communicated to an associated memory.

In a preferred embodiment, the event data includes data representing a kidnapping, bank robbery, retail robbery, and/or vehicle theft. In this embodiment, the notification data is generated from a wireless device associated with the selected asset. In a preferred embodiment, the candidate data includes data representing a number of candidates, vehicle identification, and data representing a risk level associated with at least one candidate. In one embodiment, law enforcement data is received representing an individual or an organization associated with tracking of the selected asset.

Still further in accordance with the present invention, there is provided a system and method for asset tracking. An identifier, representing at least one tracking event, is received and subsequently displayed. Date data, representing the at least one tracking event, is received. The date data, representing the tracking event, is then displayed. Data representing a temporal property associated with the at least one tracking event is received and displayed. Event data, corresponding to the at least one tracking event, is received. The event data is then displayed, corresponding to the at least one tracking event.

As set forth in the detailed description, a tracking system of the present invention comprises a tracking device (hereinafter, "device" or "unit"), the existing cellular-telephone network infrastructure or wireless network infrastructure, database, analysis and display software and/or equipment (hereinafter, "device controller"), and vehicle-mobile direction-finding transceivers and man-portable (hereinafter, "hand-held trackers") direction-finding receivers (collectively hereinafter, "trackers").

The device comprises a wireless cellular-data modem or wireless networking device, and is suitably supplemented with a GPS receiver, a beacon transmitter, supervisory control logic means, antennae, a portable power-supply, a user interface, and an application specific enclosure.

In a preferred embodiment, the device controller comprises a carrier network server, a system server having computer readable medium of instruction for receiving status data from a fielded device, sending command data to the fielded device, providing database registration/deregistration for the device entering or leaving service, providing event logging for the device in service, providing a graphical tactical display that locates all active devices and trackers and hand-held trackers, and communicating tracking and location information to a hosted web-site via the Internet. The device controller suitably shares the tracking data it has collected from all trackers and hand-held trackers, thereby providing each fielded tracker and hand-held tracker with full access to view the tactical display of a developing track. Furthermore, the device controller is capable of acting as a central repository for tracking event data, as well as for system administrative functions. In addition, the device controller suitably displays, on a website, tracking and location information.

In another aspect of the subject invention, a tracker comprises a vehicle-portable direction-finding ("DF") receiver capable of homing in on a beacon signal generated by a device. The tracker is equipped so that it is network aware, as well as position aware. The tracker is capable of relaying its own position and the absolute bearing angle and/or proximity to the beacon transmitter, i.e., the device, back to the device controller using the existing cellular-telephone network. The tracker is further equipped with means adapted to receive, from the device controller, tracking data the device controller receives from other trackers and hand-held trackers, wherein the user of the tracker is provided with access to the full tactical view of a developing track. In essence, the tracker is capable of working in concert with other fielded trackers and hand-held trackers, thereby coordinating activities in a "wolf-pack" fashion. In an alternate embodiment, the tracker is also suitably equipped with a global positioning system to provide fine-position resolution.

In another embodiment, the tracker is a hand-held module, i.e., a hand-held tracking receiver, to be used in environments that do not permit vehicle access; i.e., within buildings, shopping centers, etc. These devices are also suitably network- and position-aware, and optionally include fine-position resolution capability using the global positioning system (GPS). Each tracking receiver is capable of relaying its own position and the absolute bearing angle and/or proximity to the beacon transmitter back to the device controller via the existing cellular-telephone or wireless area network. The hand-held tracker is further equipped with a display and user interface, a cellular modem or other suitable network interface, a microcontroller, and a direction finding receiver. In an alternate embodiment of the hand-held tracker, there is provided a heading sensor compass and a GPS receiver.

Still other aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings, incorporated in and forming a part of the specification, illustrate several aspects of the present invention, and together with the description serve to explain the principles of the invention. In the drawings.

DETAILED DESCRIPTION OF THE INVENTION

Throughout this description, the preferred embodiment and examples shown should be considered as exemplars, rather than limitations, of the present invention.

The present invention relates generally to tracking systems for tracking the location of valuable materials, persons, objects, and more particularly, but not limited, to the tracking of stolen articles, object or persons through existing cellular network infrastructure, global positioning system (GPS), and location algorithms using a combination of directional vectors and signal strength estimates based on Radio Frequency transmissions. As will be appreciated from the subject description, the subject invention teaches a tracking system and method that is accurate, is of lower cost and which allows for improved tracking and interception of tracked assets.

Figure 1:
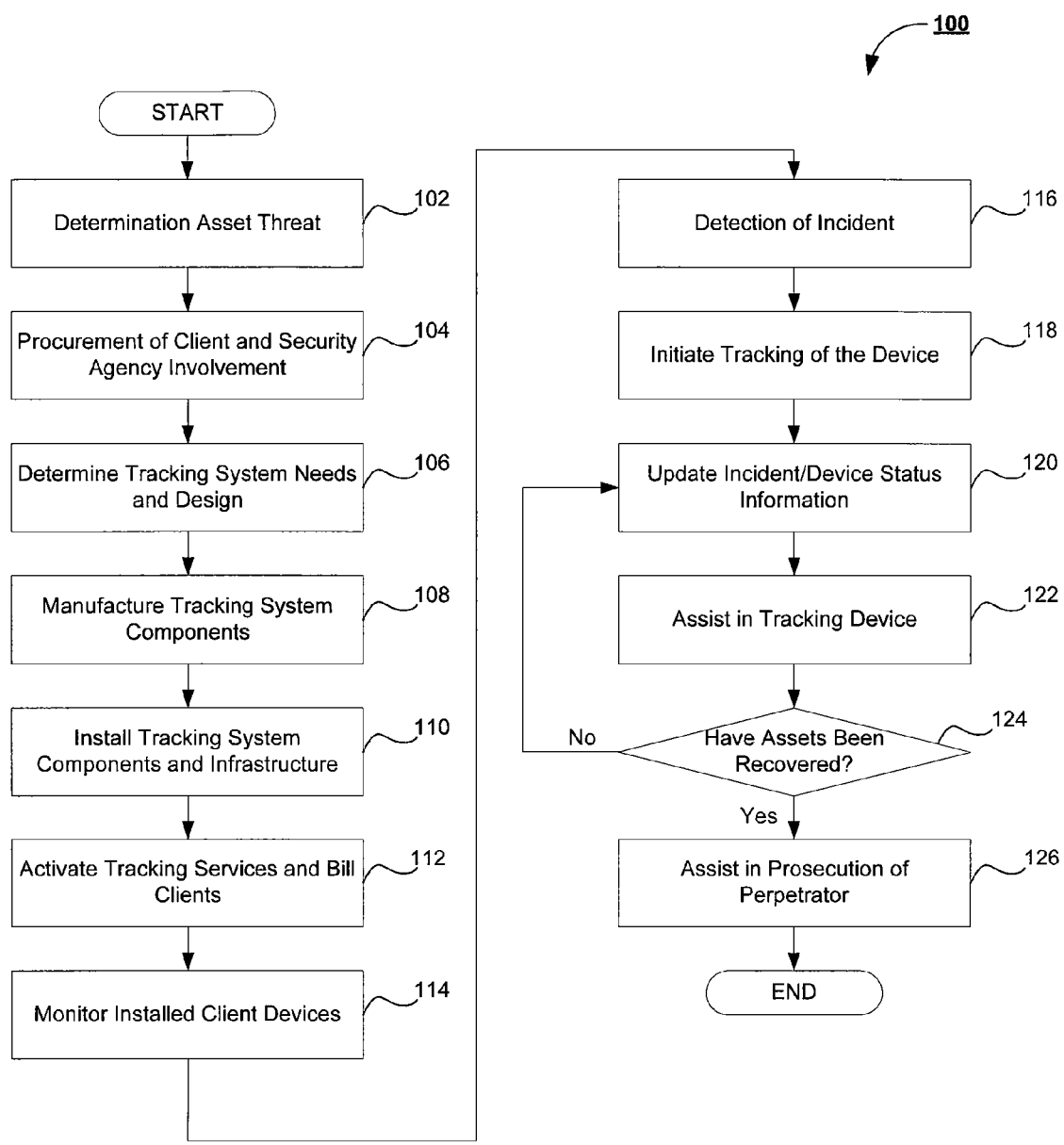
FIG. 1 is an illustration of a flowchart showing a method for locating an asset in accordance with the present invention.
Figure 2:
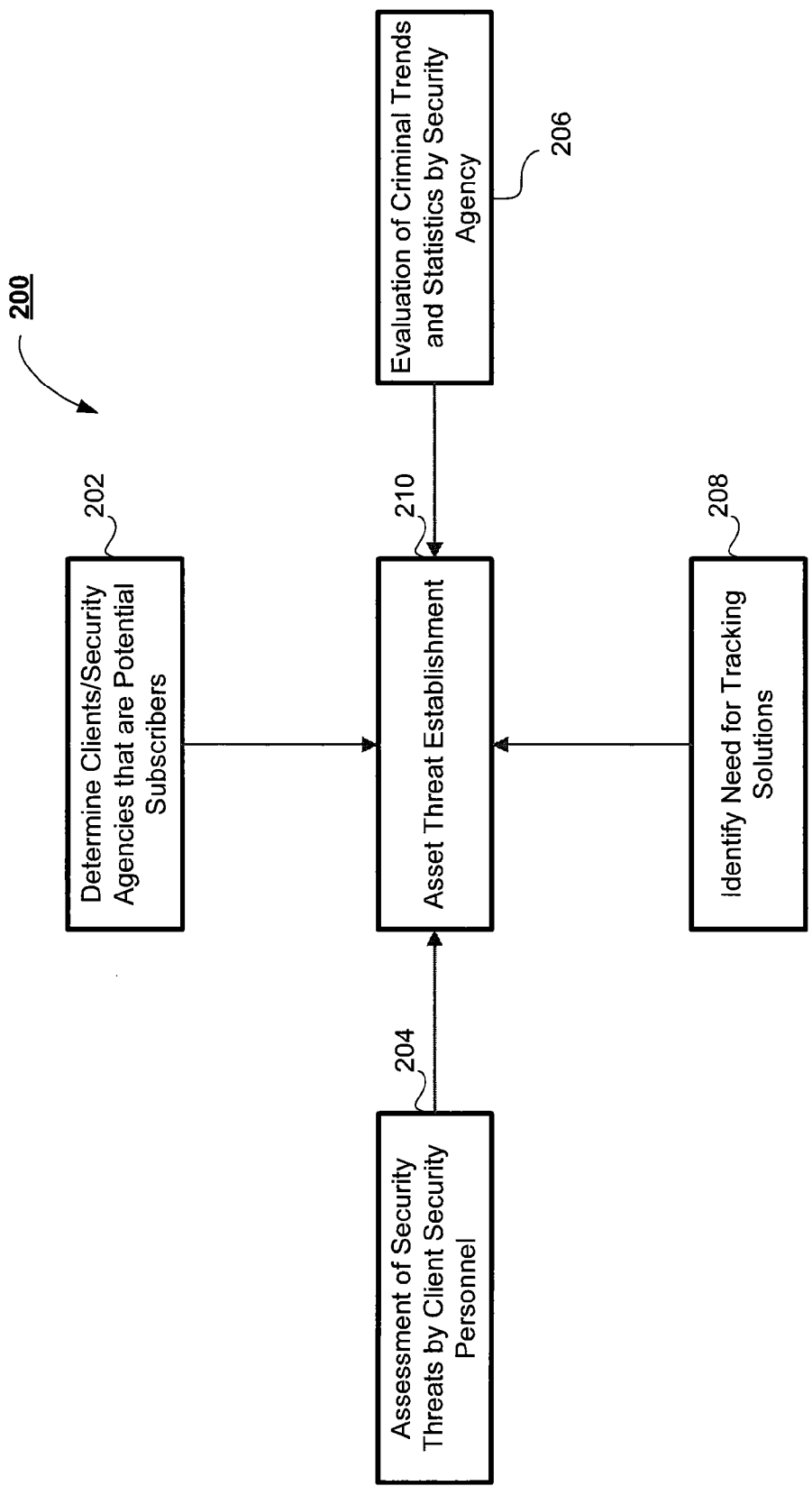
FIG. 2 is an illustrative example of asset threat determination according to the present invention.

Referring now to FIG. 1, there is shown a flowchart 100 in FIG. 1 illustrating a method for providing an asset tracking and location service in accordance with the present invention. Beginning at step 102, an asset threat determination or recognition is made by the service provider. The asset threat determination is based upon a plurality of indicators, including criminal activities in a particular area, potential client security concerns, historical indicators, and the like. For example, FIG. 2 illustrates an example 200 of client and security agency involvement in determining threats to client assets 210. The service provider first determines those clients and/or security agencies that are potential subscribers at 202. The client's security department, personnel and the like are prompted to assess the threats to client assets at 204. In addition, the security agency, or law enforcement, evaluates crime trends and statistics at 206, while the service provider identifies the need for asset tracking solutions to both the potential clients and the potentially active security agencies at 208. It will be appreciated by those skilled in the art that various components of the service provider, such as a marketing department, advantageously coordinate the recognition of threats to assets by the client and the security agency.

Figure 3:
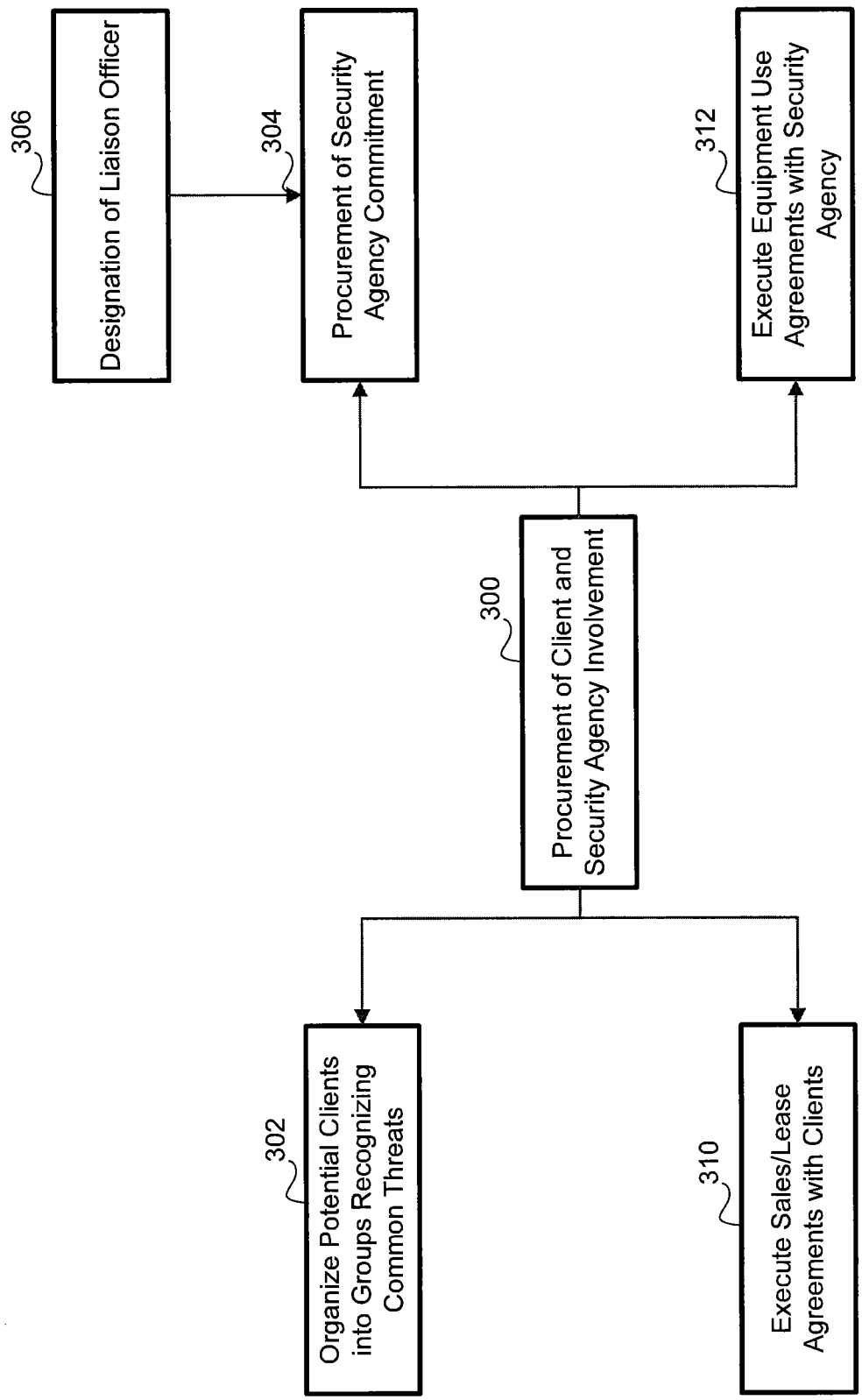
FIG. 3 is an illustrative example of client and security agency procurement in accordance lo with the present invention.

At step 104, active subscription of the client and the security agency are procured by the service provider. As will be appreciated by those skilled in the art, the subscription by the client is suitably capable of differing from that of the security agency. For example, the client subscription requires payment of a monthly, quarterly or yearly fee, while the subscription to the security or law enforcement agency may require no fees. FIG. 3 illustrates an example of the procurement of client and security agency involvement 300. The service provider organizes the potential clients into groups having the same or similar threats at 302. As these groups are organized along common asset threats, the service provider executes sale, lease, and/or service agreements with the clients at 310. It will be appreciated by those skilled in the art that the sale, lease, and/or service agreements suitably include provisions regarding monitoring, payments and other provisions as is known in the art.

Concurrently with procuring clients for the asset tracking services offered by the service provider, the service provider also procures commitment from the security agency to participate in the asset tracking and location system at 304. In the preferred embodiment, the security agency suitably designates a liaison officer at 306 to oversee communications between the service provider and the client. The security agency is then prompted to execute a suitable agreement regarding use of equipment and participation in the tracking system at 312. It will be understood by those skilled in the art that the procurement of security agency participation and client participation need not occur in any particular order and that for ease of explanation, concurrent procurement is used. The present invention is not limited to concurrent procurement of participation by the clients and the security agency.

Figure 4:
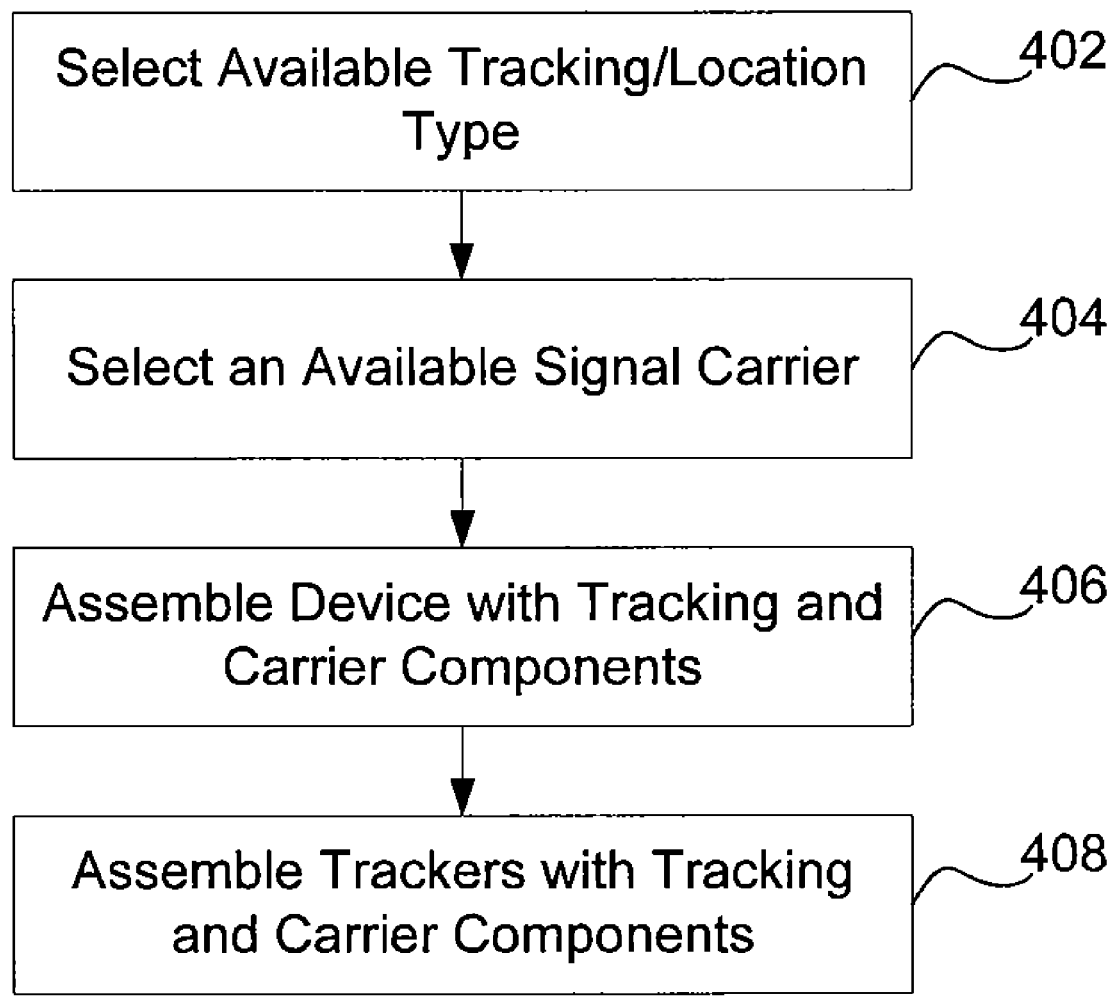
FIG. 4 is an illustrative example of tracking system needs determination and design in accordance with the present invention.

Returning to the flowchart 100 of FIG. 1, following procurement of client and security agency participation at step 104, the method proceeds to step 106, wherein the tracking system needs and design are determined. The process for determining the design of the tracking system to be used by the subscribing client is best illustrated with reference to FIG. 4. As shown in FIG. 4, the service provider, with input from the client and the security agency, selects an available location tracking type at 402. As discussed above, location tracking types include, but are not limited to combined radio-frequency triangulation and global positioning system tracking, radio-frequency triangulation tracking, and combined radio-frequency triangulation and cellular sector tracking.

At 404, the service provider, based upon the available carriers, selects a signal carrier. For example, the service provider selects a paging service carrier, a proprietary wide area network carrier or a cellular carrier. Following the determination of the tracking system needs at step 106, the tracking system components are assembled at step 108. Referring to FIG. 4, the service provider then assembles the device in accordance with the selected tracking type and the selected carrier at 106. It will be understood by those skilled in the art that the device suitably comprises the transmitters corresponding to the selected tracking location type. The device controller and the trackers are then assembled at 108 with components suitably adapted to receive the signals generated by the components of the device. Once the various tracking components have been manufactured at step 108, the service provider begins the installation of the system and associated infrastructure at step 110.

Figure 5:
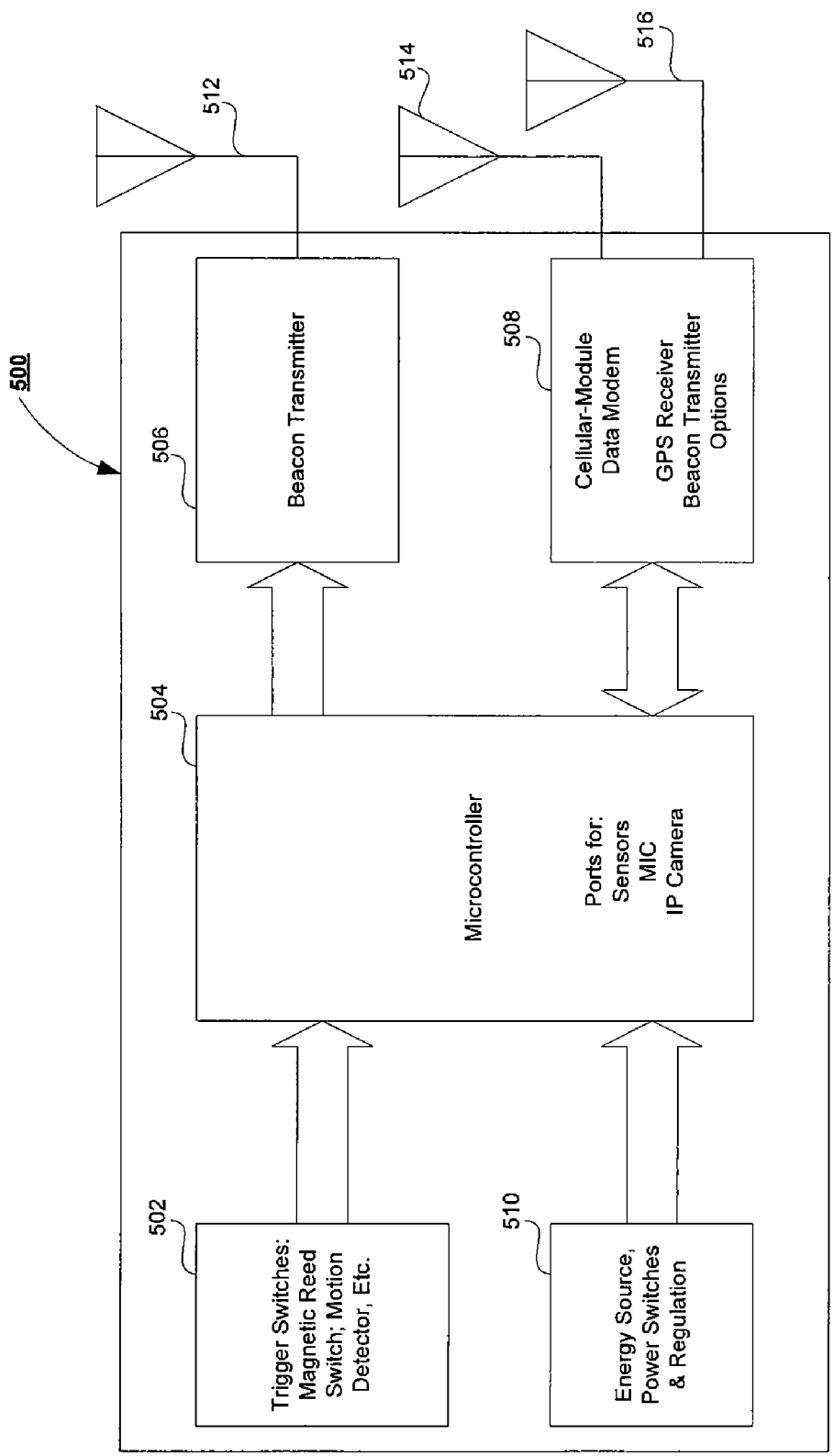
FIG. 5 is an example of a block diagram of a device.

Referring first to FIG. 5 there is illustrated a block diagram of a tracking device 500. The Tracking device 500 comprises a trigger switch 502 operatively coupled to a microcontroller 504. It will be appreciated by one of skill in the art that the trigger switch is suitably constituted by a plurality of different mechanisms and electromechanical means. For example, the trigger switch 502 is advantageously an active or passive Radio Frequency Identification integrated circuit, a reed switch, an active or passive Radio Frequency Identification (RFID) integrated circuit, a motion detector, a clock, and a counter, internally or externally activated. An energy source 510 is suitably constituted by internal or external means, e.g., rechargeable batteries, alkaline batteries, photovoltaic cells, fuel cells, lithium-ion, nickel-cadmium, or nickel-metal hydride, and provides electric power to the various other components of the tracking device 500.

The tracking device 500 further incorporates a beacon transmitter 506, and a cellular data modem 508, which is capable of including a global positioning system transceiver. In the preferred embodiment, the GPS receiver is that available on position-aware cellular phones or modems, which GPS receivers are enabled to provide to the corresponding communication network information relative to their geographic position. The beacon transmitter and its attached antenna 512, is communicatively coupled to the microcontroller 504 and receives power from the energy source 510. Similarly, the cellular data modem/global positioning system transceiver 508, and its respective antennae 514 and 516, also are communicatively coupled to the microcontroller 504 and draw power from the energy source 510. One of appreciable skill in the art will take notice that the type of power source is dependent upon the application for which the tracking device 500 is being utilized. Thus, the capacity of the energy source 510 is of a size determined by compatibility with the tracking device's specific application, deployment environment, and operational endurance requirements. For example, in the case of application to persons or in applications where covertness or size is of less relevance, the endurance of the tracking device 500 will be noticeably longer than with covert application of the tracking device 500 to a valuable article, e.g., a ream of bank notes.

The microcontroller 504 functions to provide supervisory logic control over the tracking device 500. The microcontroller 504 is responsible for controlling and operating the beacon transmitter 506, controlling the cellular data modem 508, receiving input from the trigger switch 502 and regulating the energy source 510. The microcontroller-logic section, exemplified in FIG. 5 as the microcontroller 504, is responsible for coordinating communications over the Existing cellular-telephone network, monitoring the device's 500 user-interface (if any), and managing resources used by the tracking device 500. Firmware residing on the microcontroller 504 provides for transfer of small data payloads to and from the tracking device 500. One of ordinary skill in the art will appreciate that such a transfer is suitably implemented using standard text-messaging protocols currently in widespread use. A call thereby placed includes intrinsic information associated with a call, which is either available from the message itself, contemporaneously transmitted call information, or information available from the cellular network. The firmware residing on the microcontroller 504 is equipped to accept operating-mode commands including adjustment parameters. This allows the operations of the tracking device 500 to be dynamically and finely tailored to a given tracking situation by making transmission rates, cell-modem 508 reporting intervals, message recipients, etc., remotely adjustable. It will also be understood by those skilled in the art that the microcontroller 504 suitably comprises ports (not shown) for a variety of sensors, microphones, IP cameras, and the like. The addition of various ports to the microcontroller 504 enables a broader range of data to be collected by the tracking device 500. Such additional information is suitably digitized and communicated over the cellular call. It is to be appreciated that such devices are also suitably engaged, or disengaged, by data communicated to the device 500 via a cellular call as noted in more detail below in conjunction with the beacon transmitter 506 and the cellular data modem 508, so as to also advantageously realize power saving and selective utilization thereof.

The cellular-data modem 508 advantageously integrates a readily-available, modular sub-assembly, or for volume applications, is suitably based upon a fully integrated chip-level design. Operatively coupled to the cellular modem 508 is the cellular modem antenna 514. It will be appreciated that antenna 514 and 516, or a single dual use antenna, are capable of being mounted either internally or externally, dependent upon the application for which the tracking device 500 is correspondingly implemented. That is, the dual use antenna 514 combined into 516 is able to be visible externally, for instance in the case of a child's shoe, belt-buckle or the like, or operatively integrated with the enclosure of the tracking device 500, for use with bank notes, works of art, or other valuable articles. As one of skill in the art will notice, protocols used by the cellular modem 508 will depend upon the application of the tracking device 500, the location of the device, and the actual modem implemented. Protocols used by the cellular-data modem 508 include, but are not be limited to TDMA, CDMA, GSM, IP, TCIP, 802.11x, 802.16x, 802.20x, or the like. The choice of cellular-telephone or cell-based networking protocol will be dictated by the device's 500 specific application and deployment environment.

The beacon transmitter 506 may be any radio-frequency (RF) transmitter known in the art or becoming available in the art. For purposes of example only, a suitable variable frequency transmitter of 160 MHz to 460 MHz is used. An example of such a transmitter is the ETS product manufactured and distributed by Spectrum Management, LLC. One system employs a proprietary array of antennas distributed around an area of interest. This array allows for coarse tracking of a transmitter disposed within an area covered by the proprietary array. Information obtained from this coarse tracking allowed for positioning of secondary tracking devices so as to more precisely track a location of the transmitter. Such system, while fully functional, requires the added expense of installing and maintaining the proprietary transceiver network. As such, certain areas, such as rural locations, would often lack the necessary commercial activity or infrastructure to allow for operation. In addition, a growing number of locations, particularly urban locations, and corporate or college campuses, comprise large coverage of cellular, wireless networking coverage.

The beacon transmitter 506 envisioned in the preferred model of the tracking device 500 is an amplitude-shift-keyed (ASK) very-high-frequency (VHF) RF transmitter circuit that outputs 100 mW of RF energy into a 50 Ohms load. The beacon transmitter 506 is controlled and operated by supervisory logic control means implemented in the microcontroller 504. The beacon transmitter 506 is operatively and communicatively coupled to the beacon transmitter antenna 512. In one embodiment, the antenna 512 is integrated into the tracking device 500 enclosure. The skilled artisan will appreciate that the antenna 512 is capable of being externally mounted, depending upon the application for which the tracking device 500 is currently being implemented. It will be noted that each beacon transmitter 506 used in implementing the subject invention uses a unique identification code. Such code is suitably differentiated by software integral to the beacon transmitter 506 or by code residing in the microcontroller 504.

A particular adaptation of the tracking device 500 allows for power savings to be realized when the beacon transmitter 506 is not yet required insofar as a fine level tracking via antenna 512 is not yet commenced. In this embodiment, microcontroller 504 is advantageously made responsive to a selected input received into cellular modem 508. That input includes coded data that selectively enables or disables operation of the beacon transmitter 506. Thus, battery power is conserved by only enabling the beacon transmitter 506 at such point as is desired by a monitoring agency or associated law enforcement agency. In addition, the absence of any signal, other than that of a conventional cellular or mobile phone call may render a signal more difficult to detect by external signal detection means. Additionally, the microcontroller 504 is advantageously supplied with a suitable timing algorithm to periodically enable and disable the cellular data modem 508 for a selected duration. A particular duty cycle is chosen so as to allow for sufficient tracking intervals to be maintained for a particular situation or application. This cycle is suitably fixed in software, or communicated to the microcontroller from a monitoring agency via a cellular link to address the needs of a particular tracking event. This functionality advantageously allows for minimizing interference associated with cellular data transmissions. By way of example, cellular transmissions, particularly some GSM transmissions, may be detectable by RF static that might be noticed in a conventional radio receiver. Minimizing the duty cycle will minimize an opportunity for one to notice that cellular broadcasts are being made.

It is to be appreciated that in embodiments employing wireless networking protocols, such as 802.11x protocols, many power saving hardware and software systems are additionally available, as will be appreciated by one of ordinary skill in the art, that advantageously provide further power conservation ability.

The tracking device 500 is capable of implementation in a variety of forms, depending upon the application for which the tracking device 500 is utilized. For example, and not intending to limit the protection for which the subject invention is legally and equitable entitled, there are planar embodiments, formed cavity embodiments, modular or integrated embodiments, embodiments utilizing camouflaged means, etc. One representative embodiment is that of a flat, planar form capable of insertion, without noticeable deformation, between two (2) bank notes sealed together. There is also insertion into the sole of a shoe or belt enabling location of a missing person. Further enclosure embodiments are advantageously customized to represent the desired object for affixation of the tracking device 500.

Figure 6:
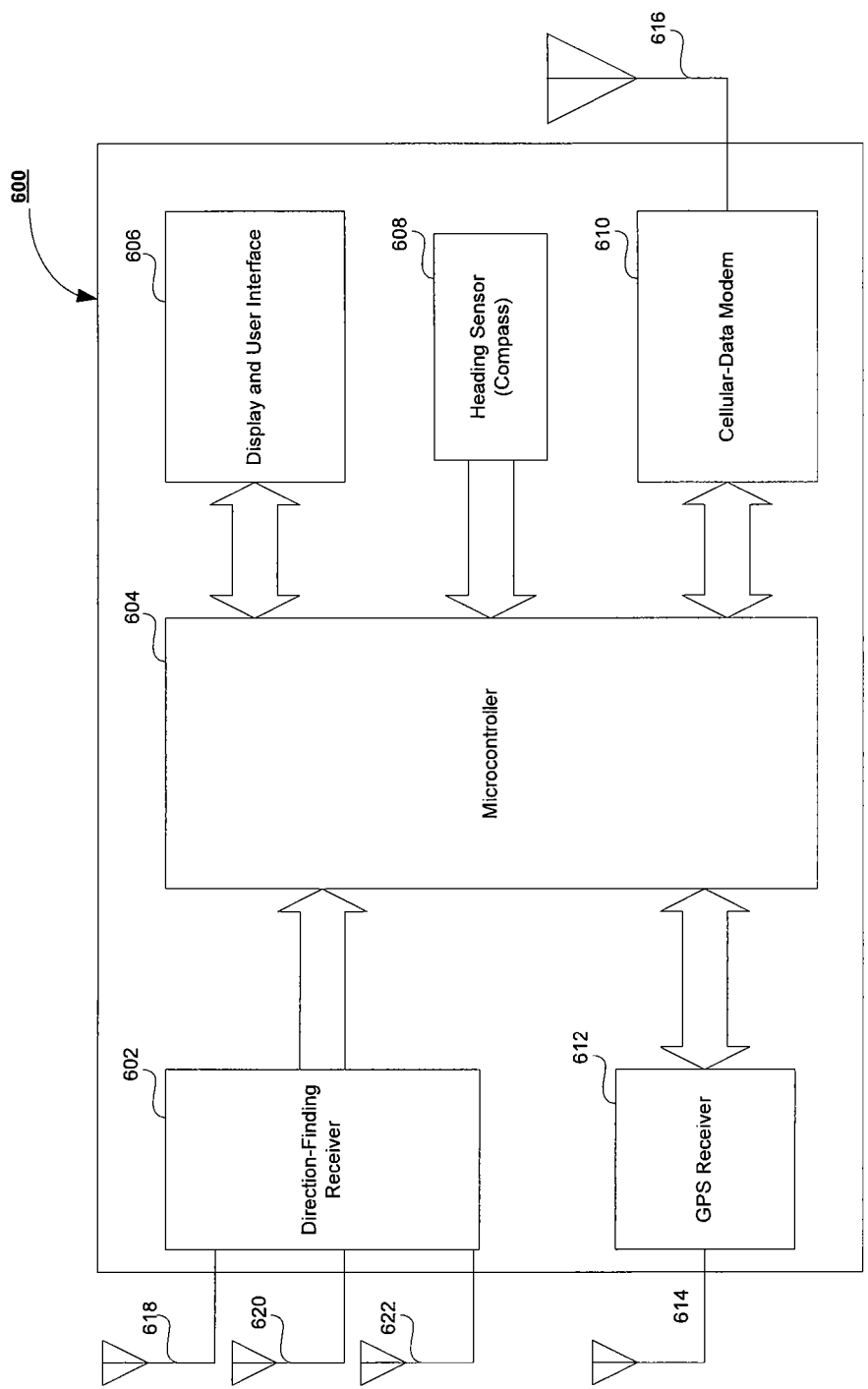
FIG. 6 is an example of a block diagram of a tracking receiver.

Turning now to FIG. 6 there is provided a block diagram exemplifying the subject invention's tracking receiver 600 receiving components, or the internal components of the tracker and hand-held tracker. As will be appreciated by one of skill in the art, the enclosures for the tracker and the hand-held tracker are capable of taking any number of formats, from a laptop computer, a Personal Data Assistant (PDA), a cellular telephone, a desktop computer, or the like. Of importance, as observable to the skilled artisan, is the inclusion of the components outlined in FIG. 6. For purposes of explanation of FIG. 6, the term "tracking receiver 600" is used to reference the tracker and the hand-held tracker.

The tracking receiver 600 of FIG. 6, includes a microcontroller 604 suitably adapted to control a variety of integrated components and external devices. It will be appreciated by those skilled in the art that microcontroller 604 is suitably implemented by the microprocessor of a typical laptop, desktop or PDA. Operatively coupled to the microcontroller 604 of the tracking receiver 600 is a direction-finding (DF) receiver 602, with three attached antennae 618, 620 and 622. As contemplated by the present invention, the three antennae 618, 620 and 622 apportioned to the DF receiver 602, as will be apparent to one skilled in the art, enables the DF receiver 602 to triangulate the signal broadcast by the beacon transmitter 506 of the tracking device 500. The DF receiver 602 is communicatively coupled to the microcontroller 604. The microcontroller 604 then implements supervisory logic means stored thereon to facilitate the translation of inputs received via the DF receiver 602 onto an integrated user interface and display 606. The microcontroller 604 is suitably realized from a microprocessor residing on a laptop computer, PDA or other mobile computing device.

The microcontroller 604 is operatively coupled to an optional GPS receiver 612 and an optional heading sensor/compass 608. The optional equipment provides greater range and mobility to the tracking receiver 600 than the DF receiver 602 alone. The tracking receiver 600 further includes a cellular data modem 610 and a cellular modem antenna 616 in operative connection with the microcontroller 604. The GPS receiver 612 and the heading sensor (compass) 608 are optionally depicted in FIG. 6 and do not form part of the preferred embodiment.

The display and user interface 606 are any display and/or user interface known in the art, ranging from any suitable video display, such as a CRT, LCD, TFT, plasma, or other visual means for displaying the output from the microcontroller 604 enabling an operator to view a location of the tracking device 500. A standard QWERTY keyboard, touchpad, mouse, light pen, directional pad, stylus or other input means are used to implement the user interface as depicted as the display and user interface 606 of FIG. 6. The cellular-data modem or wireless interface 610 of the tracking receiver of FIG. 6 receives information from the device controller via the existing cellular network infrastructure. The information is suitably transmitted via the Internet over the existing cellular network infrastructure to the tracking device 500. Operatively coupled to the modem 610 is an antenna 616, which is alternatively integrated into the tracking receiver enclosure or extending externally therefrom. Communications between the device controller and the tracking receiver are transmitted from the modem 610 to the microcontroller 604. Such communication allows the tracking receiver to function remotely from the device controller and allows the operator to participate in the tracking of the tracking device 500.

In an alternate embodiment, the GPS receiver 612, the GPS antenna 614 and the heading sensor (compass) 608 are also depicted in FIG. 6. The inclusion of these two components into the tracking receiver allows the device controller to monitor and plot the location of all tracking receivers currently being fielded in the search for tracking device 500. While currently available cellular systems already integrate GPS capability, it is to be appreciated that the implementation of the GPS receiver 612 need not be integral to the tracking receiver. GPS modules are capable of subsequent attachment via any means known to one of ordinary skill in the art.

Furthermore, depending upon the configuration of the tracking receiver, the power supply (not shown) for the tracking receiver will vary. Such power sources include, but need not be limited to, photovoltaic cells, rechargeable batteries, alkaline batteries, generator means, or, in the case of the vehicle mounted embodiment, directly to the 12-volt system operating the internal combustion engine of the vehicle.

Figure 7:
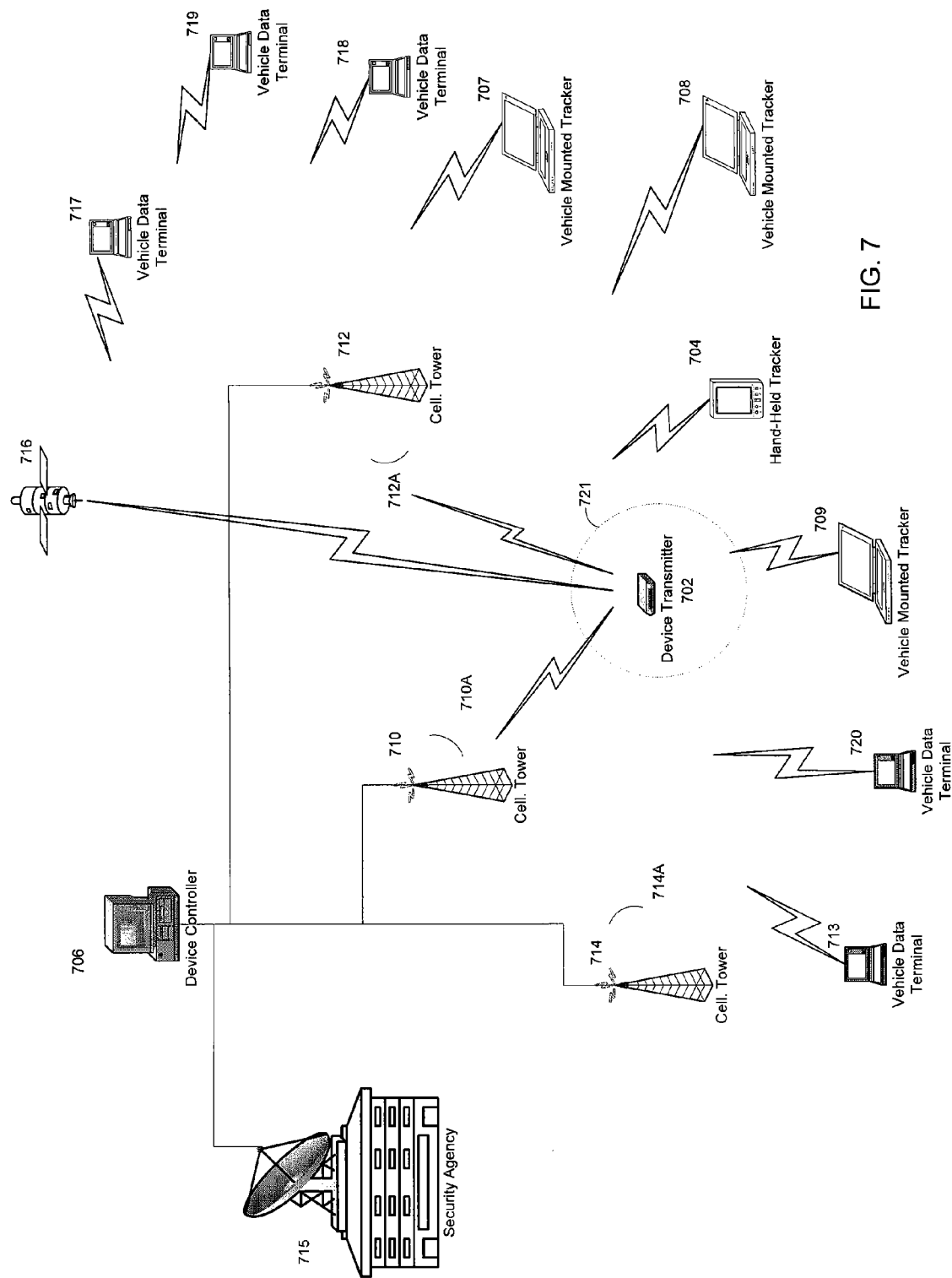
FIG. 7 is an example of a system implementing the present invention.

As used in FIG. 7, the tracking device 500 is implemented, in the form of the planar embodiment, for use with tracking a stack of bank notes stolen during a robbery, and for purposes of explanation, the planar embodiment is represented as device transmitter 702. It should be appreciated that the following example is easily relatable to another valuable article equipped with the tracking device 500 or even a missing child on which the tracking device 500 has been affixed onto an article of clothing. It should also be understood by those skilled in the art that the use of a single tracking device 500 is for exemplification only. The subject invention is equally capable of employing multiple devices for use in a single stack of currency, layered between or attached to different bills in the stack. The skilled artisan will appreciate that multiple devices in the stack of currency suitably enables continual tracking should one or more devices loose power, be discovered, or be destroyed.

Returning to FIG. 7, there is shown a device controller 706 communicatively coupled to the cellular network represented by cellular towers 710, 712, and 714, as well as in communication with the security agency 715. In the preferred embodiment, the security agency is any suitable law enforcement agency, such as a local police force, the Federal Bureau of Investigation, a state highway patrol and the like. The device controller 706, as explained above, operates to coordinate efforts of tracking the device transmitter 702 as it is moved from location to location. The device controller 706 is any suitable server or personal computer known in the art capable of executing computer program products to operate in accordance with the present invention. As the stack of bank notes (not shown) in which a device transmitter 702 is hidden, are removed from the bank drawer in which they had previously been stored, fixed strength of the magnet (not shown) mounted in the drawer and which had kept the trigger 502, e.g. inverse reed switch, opened is removed, thereby allowing the circuit to close. This then activates the microcontroller 504 by supplying power from the energy source 510. The microcontroller 504 uses the cellular modem 508 to connect to the existing cellular telephone infrastructure, represented by towers 710, 712, and 714. Concurrently with this activation of the cellular modem 508, the microcontroller 504 also instructs the beacon transmitter 506 to begin RF broadcast.

As the bank notes in which the device transmitter 702 is hidden, are brought into the coverage area of the cell tower 710, a specific 120 degree sector 710A of the 360 degree coverage area around the cell site is identified for direction purposes when the broadcast signal is picked up and the device controller 706 receives the information. The device controller 706 processes the signal, noting that the cell tower 710 is the originating tower (or access point, in the event of implementation by a wireless networking application, as will be detailed further below). The device controller 706 then determines the location of the cell tower 710 and the 120 degree Sector 710A direction (the sector indicated direction) and plots its location on a tactical map for uploading to the trackers 707, 708, 709 and the hand-held tracker 704. The trackers 707, 708, 709 and the hand-held tracker 704 are then directed by the device controller 706 to the specific Sector 710A coverage area of the cell tower 710. The 360 degree coverage area around any given cellular tower is divided into three (3) 120 degree sectors, represented in FIG. 7 as 710A, 712A, 714A, the size of the coverage area varies, but a typical coverage area ranges from a diameter of one mile to upwards of ten miles. It will be appreciated by one skilled in the art that the subject invention need not be limited to 120 degree sectors. For example, the subject invention is equally capable of implementing six (6) 60 degree sectors, or various other arcs of coverage, as dictated by the circumstances surrounding implementation of the subject invention.

While shown as a PDA, it will be appreciated that the hand-held tracker 704 is capable of implementation as any other portable communications device known in the art, provided the components, as presented herein, are included. Furthermore, the device controller 706 is depicted as a stationary personal computer, however one of ordinary skill in the art will appreciate that another computer processing device is capable of being advantageously employed in the subject invention.

The device controller 706 is capable of being implemented as a software application that runs on a standard PC, or alternatively is run as a process on a multi-tasking server-computer at the security agency (not shown) location or the service provider location (not shown). The device controller 706 provides for coarse tracking through a proprietary array of antennae distributed around an area of interest. These antennae are used to obtain information allowing for the positioning of secondary tracking devices. The device controller 706 receives status data from the fielded trackers 704, 707, 708 and 709, provides database registration/deregistration for the device 702 entering or leaving the service area, provides event logging for all devices in service, and provides a graphical representation of locations of both devices and active tracking receivers.

As the trackers 707, 708, 709 and the hand-held tracker 704 are vectored in to the general vicinity of device transmitter 702, the bank notes in which the device transmitter 702 is hidden enter the coverage area of cellular tower 712. Typical procedure for cellular architecture is to allow the cell tower 712 to pick up transmission and the cell tower 710 to drop transmission. The present invention, however, uses the relative known locations of cell towers 710 and 712, allowing the device controller 706 to narrow the location of the device transmitter 702 to a much smaller area. The art of triangulation is well known in the art and need not be re-presented for purposes of this example. The narrowed location is then transmitted from the device controller 706 to the trackers 707, 708, 709 and the hand-held tracker 704 via the cellular modems 610. At this point in the tracking process all vehicles in the law enforcement fleet equipped with vehicle data terminals 713, 717, 718, 719 and 720 become part of the tracking process.

Having thus been directed towards the device transmitter 702, the trackers 707, 708, 709 and the hand-held tracker 704 are now in range of the beacon transmitter 506. As the four trackers 704, 707, 708 and 709 approach the device transmitter 702, the DF receivers 602 (located on each tracker) triangulate the signal being broadcast by the device transmitter 702, i.e., the tracking device 500, located in the stolen bank notes. The microcontrollers 604 of the trackers 704, 707, 708 and 709 processes the triangulated signals received by the DF receivers 602 and present the operators with graphical information via the display and user interfaces 606. Updated information received via the cellular towers 710 and 712, as well as updated information from the trackers 704, 707, 708 and 709, is continually transmitted to the device controller 706. This allows the device controller 706 to monitor and direct the trackers 704, 707, 708 and 709 ever closer to the device transmitter 702.

In an alternate embodiment, using the above example and FIG. 7, there is shown one iS satellite representative of the constellation of global positioning satellites 716. In this embodiment, the trackers 704, 707, 708 and 709 are equipped with GPS receivers 612. Currently GPS information is available for use in tracking cellular phones. In one embodiment, GPS information is made available to a cellular service provider, and location information is selectively made available from the cellular service provider pursuant to an authorized request. In another embodiment, this GPS data is communicated directly to a monitoring agency via the telecommunication network. In the embodiment in which information is provided via a service provider, a server or workstation disposed at a security agency or a law enforcement agency places a request for GPS information associated with a tracking call, and this information is captured and used to generate a display. This embodiment enables a service provider to use the trackers 704, 707, 708 and 709 to track the tracking device 500, and then notify authorities to move in on the subject. Such positioning would be extremely helpful in the hands of Federal Bureau of Investigation agents pursuing a kidnapper. The agents in the field would be able to give definitive positions, in the form of longitude and latitude coordinates to other agents, closing in on the kidnapped victim.

It should be noticed that the ability to transmit position data from a tracker to the device controller 706 using existing cellular infrastructure has a myriad of potential applications. The device controller 706 is able to record and report last known positions of the device 702, the trackers 707, 708, 709 and the hand-held tracker 704. Such reports are used by law enforcement or search and rescue authorities for both the apprehension of criminals and for the rescue of stranded hikers. The use of the existing cellular infrastructure further allows the device controller 706 to transfer small data payloads to and from the device transmitter 702, implemented by using standard text-messaging protocols, such as SMS. For example, a child's shoe equipped with the device notifies the child or responsible adult of an emergency. The most appropriate format would be latitude and longitude coordinates of the site and should include a mean radius of the cell site's sector coverage area. Data transfer protocols should be standardized across all network providers. The data interface between the existing cellular telephone network and the device controller 706 could take several forms, including, but not limited to, Internet connectivity via an Internet service provider, dial-in access, or direct access via a cellular modem at the display console.

Also illustrated by FIG. 7 is a variation in a triggering mechanism that allows for lessening a risk of false triggering, as well as to allow for pre-selected areas of acceptable asset location that are not considered to be adverse. Illustrated is an area 721, suitably any acceptable area or areas that are dependent on a specific situation. Such a defined area, or areas, advantageously set forth a selected area of acceptable asset location, or conversely, a selected triggering area. Such a defined area allows for limited movement of an asset, for example, within the confines of a bank in the case of currency, or in the confines of a day care center in the case of a child, which is deemed acceptable. Conversely, in selected situations it may be advisable to have assets excluded from certain areas. Analogs of such technology may be found in home confinement bracelets, or bracelets defined to enforce maintaining selected distances of stalkers from their targets. When coupled with the subject tracking technology, additional advantages are readily realized.

Such functionality is often referred to as "geo-fencing." In the subject system, geo-fencing is suitably accomplished by pre-selecting acceptable GPS coordinates, acceptable cellular towers or wireless access points, or use of RFID triggering. Such parameters are suitably set in either a device associated with an asset, in a transmitter, on a server, or by a tracking agency or law enforcement agency.

Figure 8A:
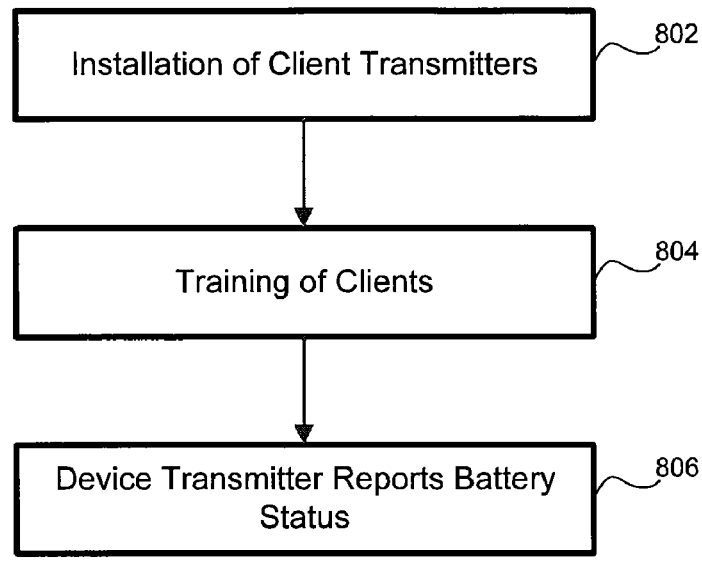
FIG. 8A is an illustrative example of an installation of a tracking system at the client in accordance with the present invention.
Figure 8B:
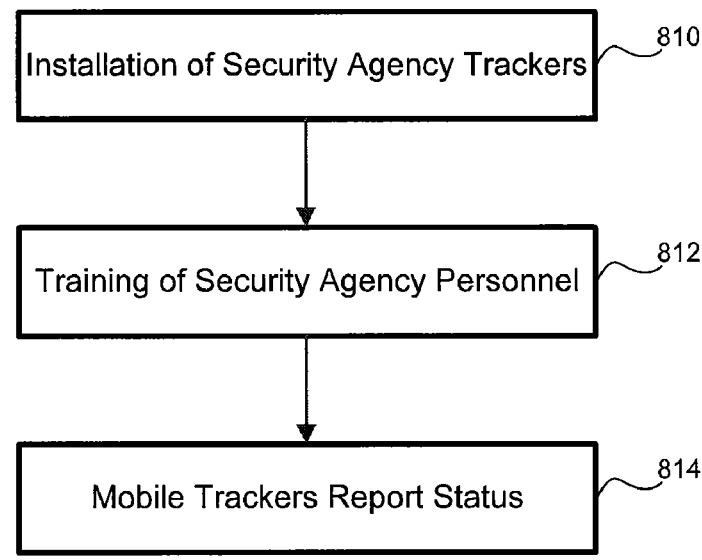
FIG. 8B is an illustrative example of an installation of a tracking system at the security agency in accordance with the present invention.

As will be appreciated by those skilled in the art, the present invention is suitably adapted to use existing telecommunications networks to facilitate the transmission of location data from the device 702 to the trackers 704, 707, 708 and 709. In addition thereto, as shown in FIGS. 8A and 8B, the present invention further includes installing the tracking device 500 in the client asset, e.g., FIG. 8A, and installing the corresponding tracking equipment, e.g., FIG. 8B. Referring to FIG. 8A, the installation of the tracking system begins with the installation of the client transmitters, or the tracking device 500, at 802. In the preferred embodiment, the tracking device 500 is installed inconspicuously into the asset to be tracked. In an alternate embodiment, the tracking device 500 is incorporated into the asset, for example a stack of bank notes, in a currency drawer at the client's place of business. It will be appreciated by those skilled in the art that the tracking device 500 is suitably adapted for incorporation into any asset desired to be protected. The service provider then trains the client subscribers to use and operate the tracking device 500 at 804. The tracking device 500 then reports, on a predetermined cycle, a status of the tracking device 500 batteries on a specified interval, such as on a weekly basis, which status is transmitted at 806 to the device controller 706.

Referring to the installation of the tracking equipment of FIG. 8B, the skilled artisan will appreciate that in accordance with the description above, one or more trackers 704, 707, 708 and 709 are installed for the security agency 715 at 810. In the preferred embodiment, the trackers 704, 707, 708 and 709 are suitably installed into one or more security agency 715 vehicles, e.g., police cruisers. The hand-held tracker 704 does not require that the unit be incorporated into a vehicle, and rather remain independent of the vehicle for locating an asset on foot. A communications link between the service provider and the security agency 715 is also installed, enabling direct communications and transmissions of location signals from the service provider to the security agency 715 and from the security agency 715 to the service provider. The skilled artisan will appreciate that the transmission of location signals from the trackers 704, 707, 708 and 709 to the device controller 706 enables the service provider to update the position or location of an asset to the subscribing client. In the preferred embodiment, the trackers 704, 707, 708 and 709 are provided to the security agency 715 at little to no cost, so as to facilitate adaptation of the tracking system of the present invention by the security agency 715.

Security agency personnel, or law enforcement officers, are then trained at 812 in the use of the trackers 704, 707, 708 and 709 to locate an asset incorporating the device 702. In the preferred embodiment, the training provided to the security agency 715 includes training of personnel at all levels, including, but not limited to, officers, dispatchers, commanders, and the like. The trackers 704, 707, 708 and 709 transmit a periodic status report at 814 to the security agency 715 and/or the service provider. It will be appreciated by those skilled in the art that the status report is transmitted to the device controller 706 at the service provider, or to a communications link at the security agency 715. In a preferred embodiment, the installation of both the client device 702 and the trackers 704, 707, 708 and 709 also includes regular system maintenance and user training.

Returning to FIG. 1, the service provider, following the subscription of a client and upon installation of the tracking system, activates the device 702 and bills the client at step 112 for the costs associated thereto. In the preferred embodiment, the client leases each device 702 and pays a monthly fee for the tracking and monitoring services provided. In an alternate embodiment, each device 702 is purchased for a set price and the client is billed for a subscription rate on a daily, weekly, monthly or yearly basis. As previously stated the security agency 715 purchases the trackers 704, 707, 708 and 709 at a reduced rate or are provided the trackers 704, 707, 708 and 709 at no charge to the security agency 715. Upon activation, the client device 702 is monitored by the service provider at step 114. Status reports are continually updated while the monitoring occurs.

Figure 9:
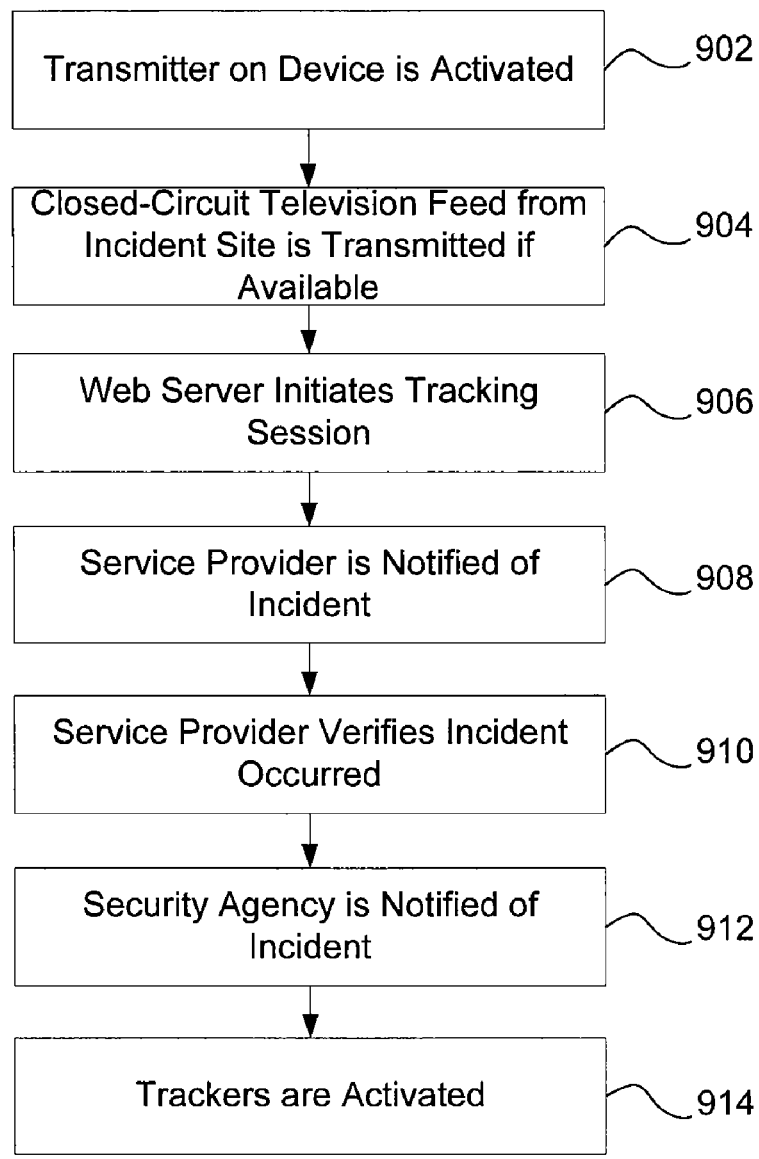
FIG. 9 is an illustrative example of the initiation of a track of a device in accordance with the present invention.

At step 116, the service provider detects the tracking device 500 has been involved in an incident, such as a theft or robbery. The detection of an incident at step 116 initiates the tracking of the tracking device 500 at step 118. Referring now to FIG. 9, there is shown an example of the initiation of a track of the tracking device 500 in accordance with the present invention. Following the detection of the incident, such as a robbery or theft, the transmitter of the tracking device 500 is activated at 902. It will be appreciated by those skilled in the art that the activation of the transmitter suitably includes registration of the transmitter on a cellular network, as described in detail above. Thus, the activation requires the transmitter to initiate a telephone call to the service provider. The service provider then contacts the cellular carrier requesting location data indicating the cellular tower or towers from which the tracking device 500 is transmitting. It will be appreciated by those skilled in the art that suitable communications between the cellular carrier and the service provider occurs over such communications systems as the public switched telephone network, a cellular telephone network, data communications via wireless WAN, or the Internet.

The skilled artisan will appreciate that the call suitably includes identification data identifying the unit making the call. Using CDMA, or code division multiple access, identifying data is automatically transmitted with the cellular call. The level of encoding inherent in such a call requires that the cellular carrier participate in the tracking operations, commonly referred to as location based service. When using, for example GSM, or Global System for Mobile Communications, the level of encoding, when suitably decoded, does not require participation by the cellular carrier for tracking. The cellular tower receiving and transmitting the call is able to be determined from the call itself. This type of location determination can use unintended information inherent in the network communications of the cellular network that describes the available cellular site location, or intended information about the cellular site location, direction and signal strength. Alternatively, when suitably selected by the client, the tracking device 500 employs GPS transmissions, thereby enabling location using GPS coordinates directly or as relayed through a cellular provider. Such tracking information is available since ownership of and access to the cellular medium is controlled.

Preferably, following registration on the cellular network, an inquiry is made to the carrier network server to establish the transmitter on the appropriate network, e.g., paging, proprietary wide area network, or cellular network. As will be understood by those skilled in the art, the tracking device 500, as stated above, is capable of being tracked using a Radio-Frequency homing beacon, the cellular location methods, or the cellular location methods combined with the GPS coordinate system, as set forth more fully herein. After the activation of the transmitter component, closed-circuit television, if available at the client location where the tracking device 500 was stored, is activated at 904.

The activation of the transmitter and the closed-circuit television feed are then uploaded to a web-server at 906. The service provider is notified at 1008 of the incident and verifies at 910 that the transmitter has actually been activated. In the preferred embodiment, the web server initiates a web tracking session, which enables a client to log on to the web server and view status information regarding the transmitter and the efforts being made to locate and recover the asset. Once verification of the incident has occurred, the security agency 715 is notified at 912. The security agency 715 then activates the trackers 704, 707, 708 and 709 in preparation of responding thereto. In an alternate embodiment, the web tracking session further includes a post session analysis regarding the track of the asset, from loss to recovery.

Figure 10:
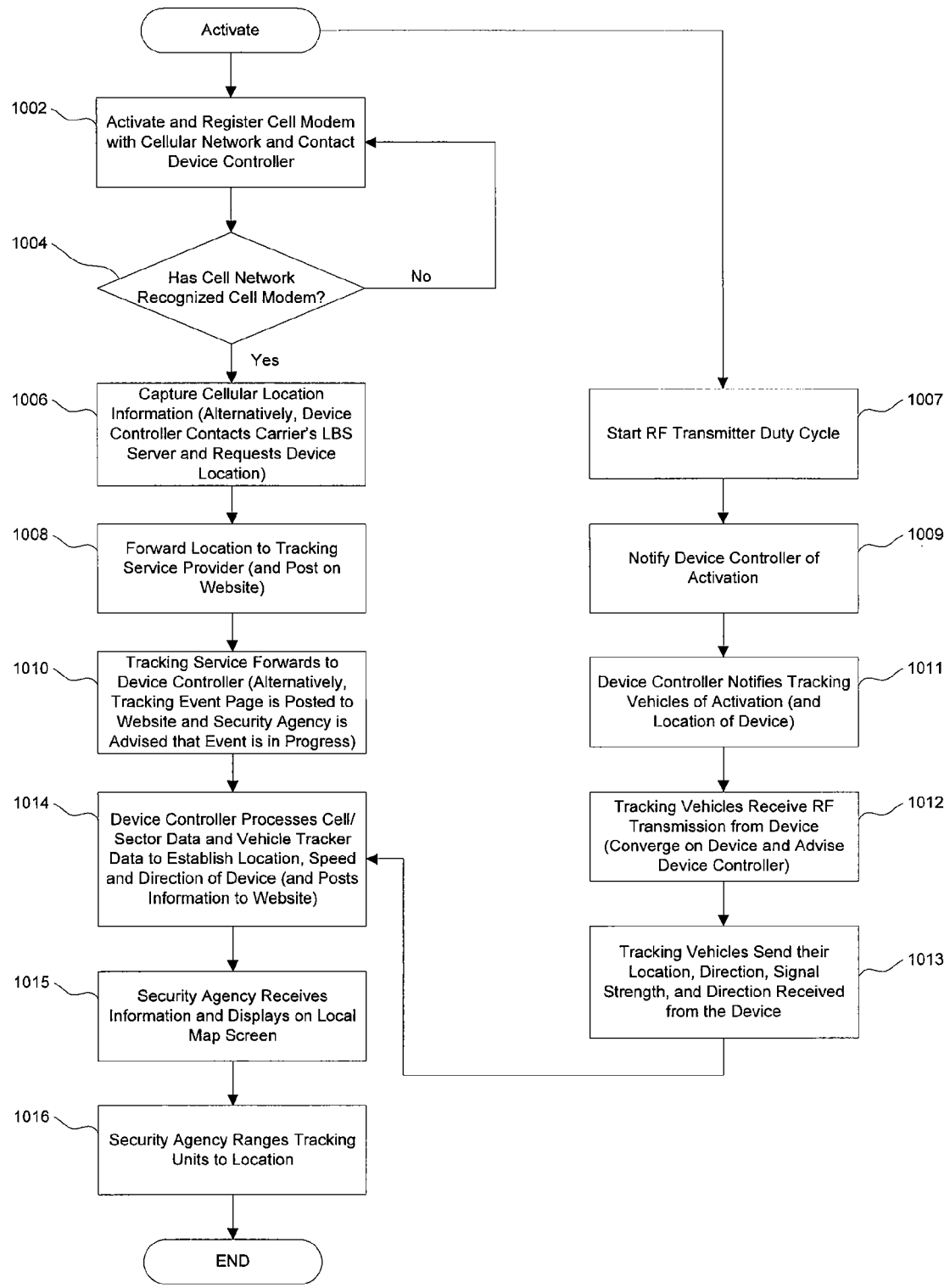
FIG. 10 is an illustration of a flow chart of a method in accordance with one aspect of the present invention.

Referring now to FIG. 10, there is shown a flow chart depicting the operation of the system of the subject invention. The operation of the system requires a number of operations to be performed to allow the location of the tracking device 500 to be used by the trackers 704, 707, 708 and 709. Beginning at step 1002, the cellular modem 508 of the tracking device 500 is activated and registered with the cellular network. It will be understood, with respect to the subject invention discussed above, that the triggering event, i.e., the event causing the activation, is any movement or other means of activating the tracking device 500. The method progresses to step 1004 where a determination is made whether the cellular network has failed to recognize the cellular modem. If the cellular modem is not recognized by the cellular network, the method then returns to step 1002 and the cellular modem again attempts to register with the existing cellular network. If the tracking device 500 has successfully registered with the cellular network at step 1004, the method proceeds to request the cellular location information from the cellular networks location based service Server at step 1006.

After capture of the location information, the system will proceed to step 1008, where the location information is transmitted to the Tracking service provider or Internet service provider. The service provider, depending upon the type of services being provided, or alternatively, the Internet service provider, forwards the information along to the device controller 706 in step 1010, or provides the location of the tracking device 500 to the owner as part of the services provided thereto. In the event that the information is passed on to the device controller 706 in accordance with step 1010, the device controller 706 at step 1014 receives the information and processes the cellular/Sector data and the corresponding vehicle tracker data to establish the speed and direction of the tracking device 500.

At step 1015, the security agency 715 receives the information and displays the location on a local map screen. It will be understood by those skilled in the art that the security agency 715 is any governmental or security organization capable of locating and/or apprehending the tracking device 500. It will be further appreciated by one of ordinary skill in the art that any other suitable display will be satisfactory to accomplish the forgoing.

The security agency 715 is then able to forward the tracking information to its police units in the field at step 1016. This equates to the security agency 715 using the information garnered from the existing cellular network to vector its units towards the tracking device 500. Once in the general area, as directed by the security agency 715 in step 1016, the fielded units use a vehicle mounted tracker or a hand-held tracker 704 to close in on the tracking device 500.

Alternatively, as shown in FIG. 10, when the cellular network is not available, the tracking device 500 activates a Radio-Frequency (RF) transmitter at step 1007. At step 1009, the device controller 706 receives the RF transmission and becomes aware of the activation. The device controller 706 then notifies tracking vehicles of the activation at step 1011. Beginning at step 1012, the tracking vehicles receive the RF transmission from the tracking device 500. The tracking vehicles then send their corresponding location, direction, signal strength and direction from which the RF transmission is being received to the device controller 706 at step 1013. The system then returns to step 1014, where the device controller 706 processes the incoming information in order to accurately determine the location, speed and direction of the tracking device 500. The system continues to operate as set forth above.

Figure 11:
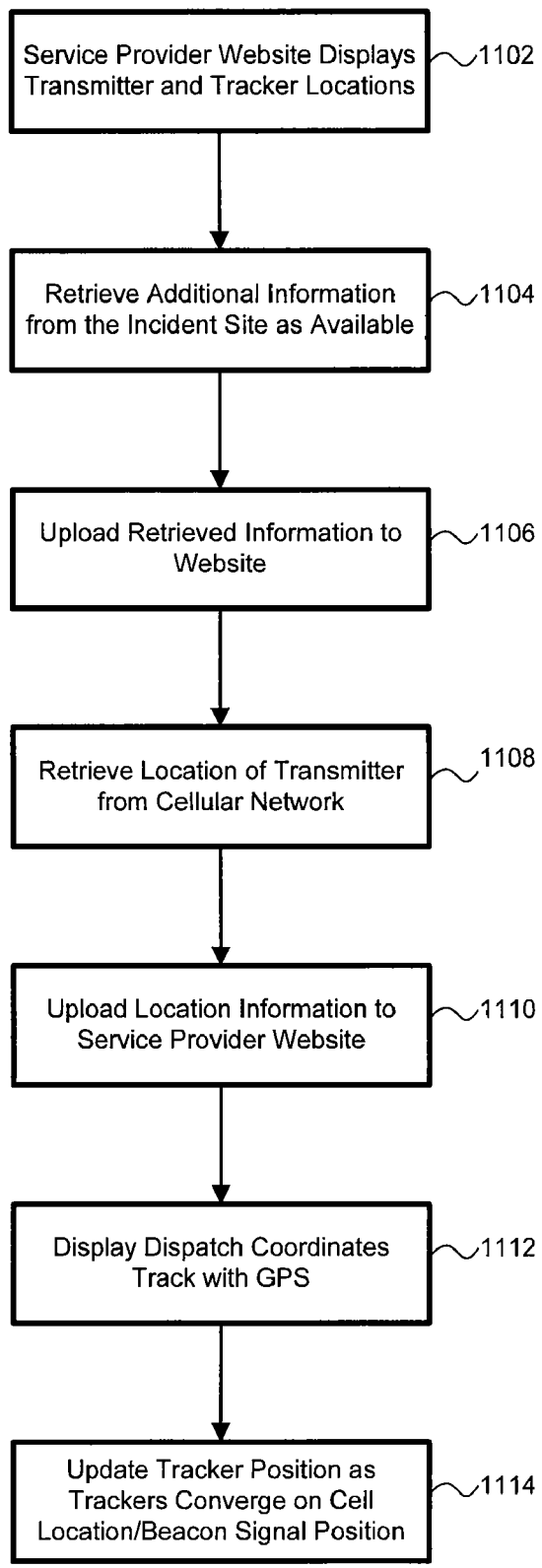
FIG. 11 is an illustrative example of the status update in accordance with the present invention.
Figure 12:
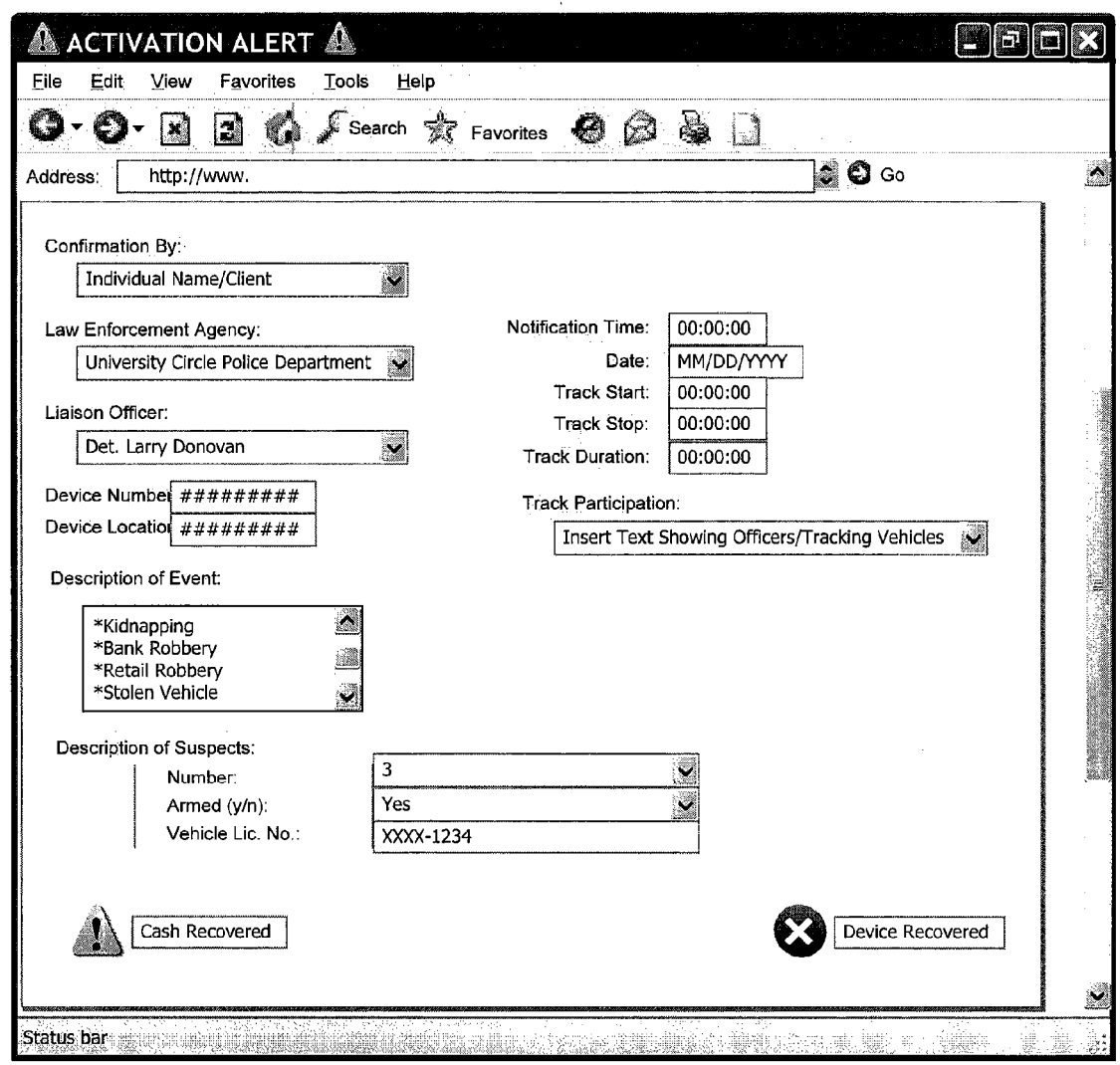
FIG. 12 is a template illustrative of an activation alert screen in accordance with the present invention.
Figure 13:
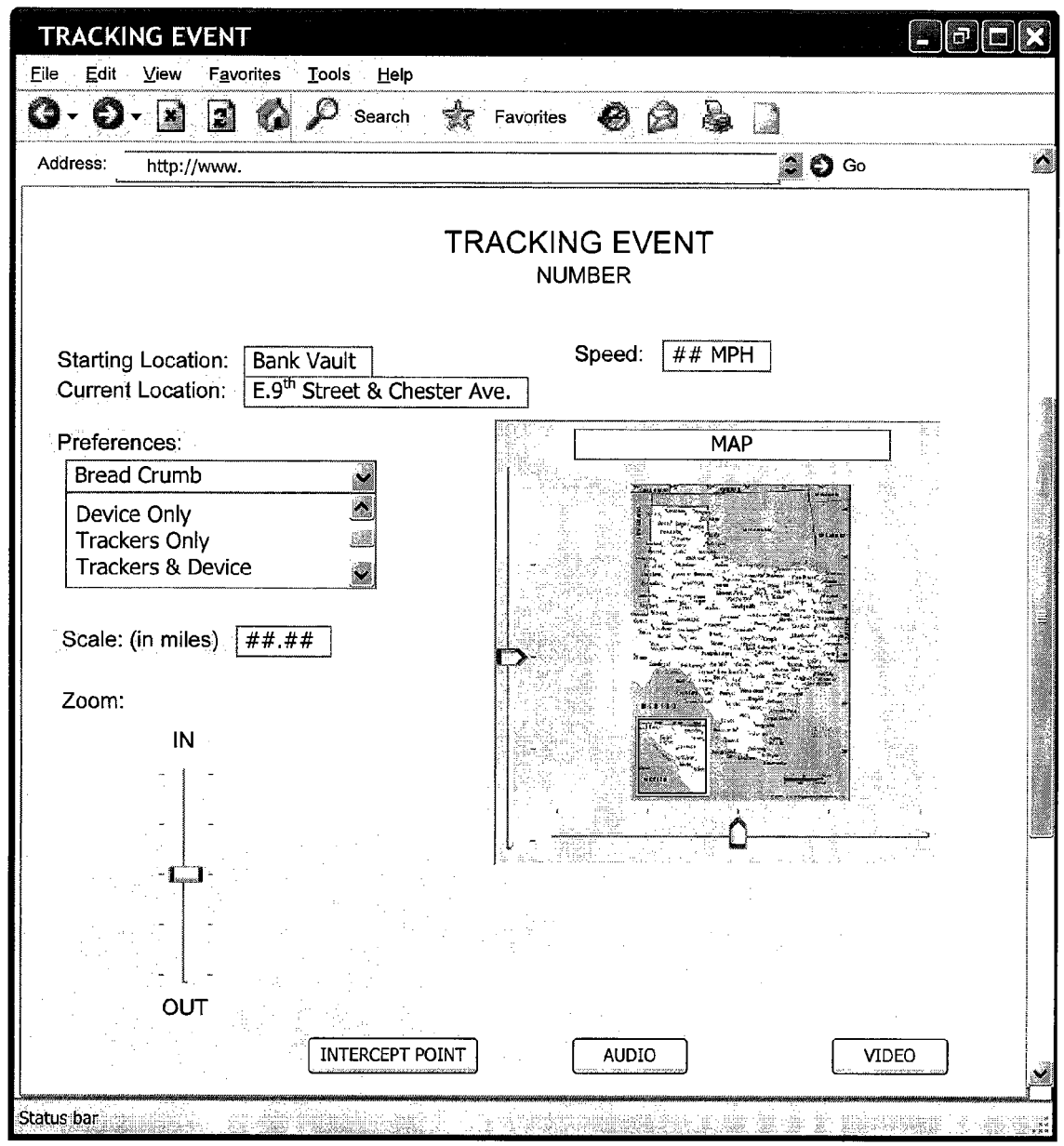
FIG. 13 is a template illustrative of a tracking event screen in accordance with the present invention.

Returning to FIG. 1, following the initialization of the tracking of the tracking device 500, the system continuously updates, in real-time, the incident and tracking device 500 status information at step 120. For example, the client and the security agency 715, via the web session, can follow the search and recovery efforts being undertaken in real-time. Referring now to FIG. 11, there is shown an illustrative example of the status update according to the subject invention. Beginning at 1102, the service provider displays the location of the transmitter, e.g., the tracking device 500, and the tracking units, e.g., the trackers 704, 707, 708 and 709, on the service provider website. FIG. 12 illustrates a template of an activation alert screen displayed to a user, informing the user that a tracking device 500 has been activated. As demonstrated in FIG. 12, a user is suitably provided with relevant information regarding the incident giving rise to the activation alert. For example, FIG. 12 illustrates the confirmation identity of an individual confirming the activation was not in error. In addition, suitable law enforcement information is provided, as well as information regarding the type of event, the description of the suspects and the time/date information relating to the event. The skilled artisan will appreciate that suitable identifying information regarding the suspects includes, without limitation, articles of clothing, vehicle data, armament of suspects, and the like. The skilled artisan will further appreciate that suitable event information includes, without limitation, kidnapping, bank robbery, retail robbery, stolen vehicle and the like. As additional information becomes available regarding the incident site, it is retrieved by the service provider server at 1104. At 1106, the additional information, if any, is uploaded to the website and displayed to the client and to any security agency 715 personnel having access to the website. FIG. 13 is a template illustrating a suitable web-based display regarding the incident, or tracking event. As shown in FIG. 13, the client or security agency 715 is able to selectively view different tracking displays, such as only the tracking device 500, the trackers 704, 707, 708 and 709, or the tracking device 500 and the trackers 704, 707, 708 and 709. Via the map display, the viewer is able to zoom in or out on the tracking device 500, track the speed and the current and starting locations of the tracking device 500. In addition, as shown in FIG. 13, the viewer is able to select audio, video, or an intercept, via access links located on the template screen.

The intercept function, as illustrated in FIG. 13, provides for significant advances over earlier tracking systems. In accordance with an embodiment employing a tracking function, location data associated with an asset being tracked is relayed to the security agency. In this system, tracking data is also advantageously received for each of at least one tracking vehicle (or individual) associated with tracking the asset. Such vehicles are suitably supplied with tracking devices, such as tracking device 500 that is employed in connection with a tracked asset. It is to be appreciated, however, that with a tracking vehicle, a tracking device is likely connected with a more durable power supply, and is suitably provided with a more powerful transmitter. Also, the system is not generally required to be hidden or disguised. Thus such tracking devices do not have limitations associated with a discreet or hidden tracking device. Tracking information from such vehicles is also suitably supplied to the tracking agency via a direct broadcast, or communication via any suitable transmission medium, such as WiFi, 802.x, WiMax, or the like.

A security agency is thus provided with location data associated with a tracked asset, along with position of tracking vehicles. This location information, coupled with readily available geographic information, allows for ready calculation of separation, relative displacement, relative velocity and optimal intercept parameters. Such optimal intercept parameters suitably include a vehicle that is closest, and advantageously integrates readily available topographic and street layout data so as to calculate a best intercept route. Also, with multiple vehicles, a calculation is readily made to allow for positioning of various vehicles to cover possible, or likely, alternative routes that may be chosen by a perpetrator of an asset of interest. Of course, since it is contemplated that tracking information associated with an asset is continuously or periodically updated, tracking vehicles are suitably positioned and repositioned in accordance with asset movement. A best intercept route advantageously takes into account travel distance, speed limits, traffic congestion, and the like.

A display, such as that of FIG. 13, is enabled to give a visual representation of the tracked asset as well as each tracking vehicle. Intercept data is communicated, either in real time, or periodically, to each tracking vehicle to allow for better tracking, adjustment, and optimized coordination between vehicles.

At 1108, the service provider server retrieves location information of the tracking device 500 and the trackers 704, 707, 708 and 709 from the cellular network, as set forth in detail above. This location information is then uploaded to the website at 1110 for the client to view. It will be understood by those skilled in the art that the website is suitably capable of displaying past and current tracking information, such as on a map, grid or the like. The skilled artisan will also appreciate that the information uploaded to the website is continuous and in real-time. At 1112, the website displays for dispatch, the coordinates of the track with GPS. As the trackers 704, 707, 708 and 709 converge on the cell location/beacon signal of the tracking device 500, the respective positions of the trackers 704, 707, 708 and 709 are updated on the website.

Referring to FIG. 1, at step 122, the service provider assists in the tracking and recovery of the asset. As shown above with respect to FIG. 10, the service provider assists in the recovery of a stolen or missing asset. A determination is then made at step 124 that the asset has been recovered. At step 126 the service provider assists in the prosecution of the apprehended perpetrator as requested by the security agency 715. When the asset has not been recovered at step 124, the device status information is updated at step 120 and the service provider continues to assist the security agency 715 in the apprehension of the perpetrator and the recovery of the asset at step 122.

The present invention further provides for the storing and viewing of tracking and service data in a database for viewing by the client and/or security agency 715. As illustrated in FIGS. 14-17, various templates enable the client and/or security agency 715 to access and search the database for information relating to a specific client, an event, a specific tracking device 500 and the like. The skilled artisan will appreciate that various other displays are capable of being displayed and the screenshots illustrated in FIGS. 14-17 are for exemplary purposes only.

Figure 14:
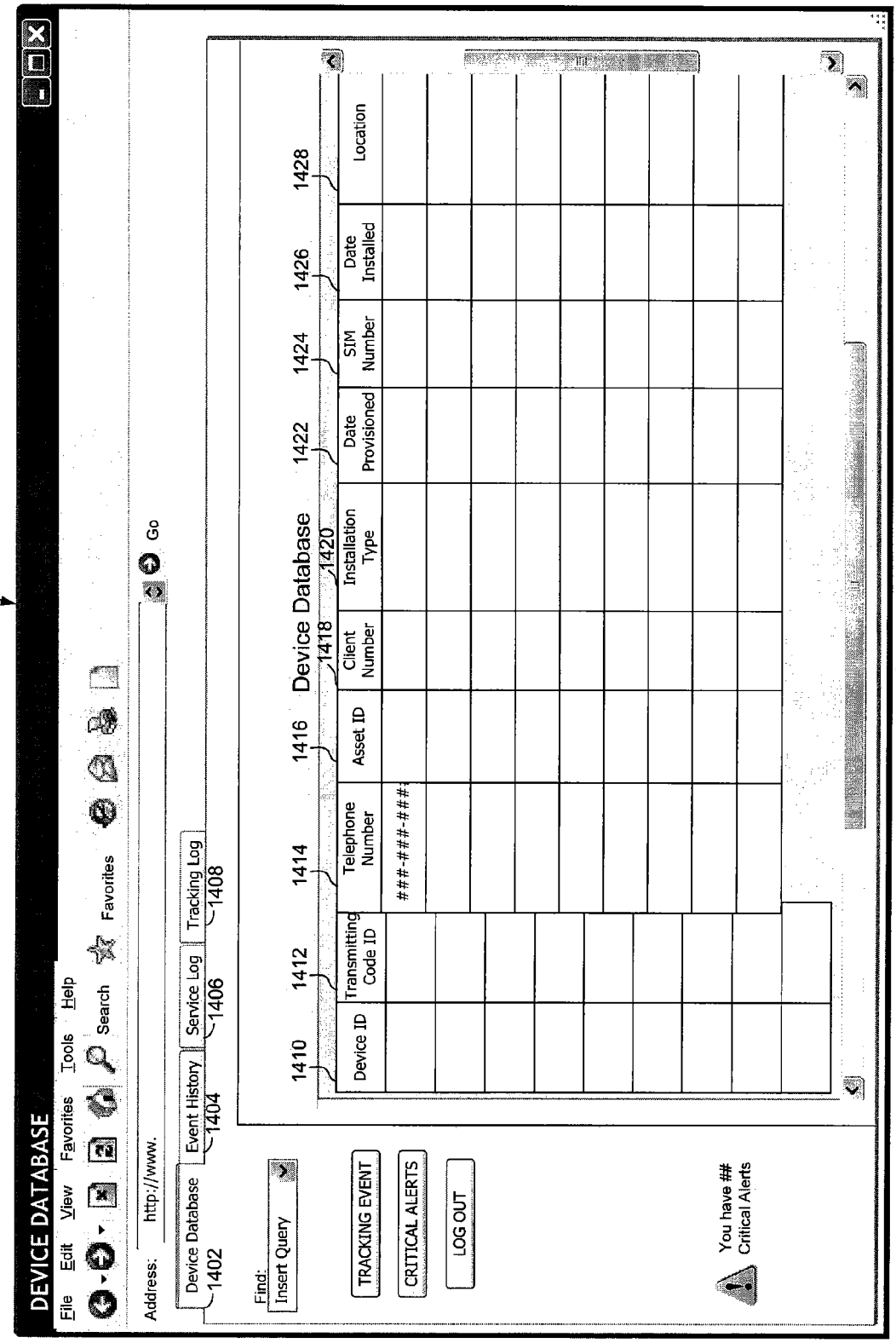
FIG. 14 is a template illustrative of a device database screen in accordance with the present invention.

Referring now to FIG. 14, there is illustrated a template screenshot showing a spreadsheet 1400 regarding various devices 500. As will be appreciated by those skilled in the art, the spreadsheet 1400 of FIG. 14 suitably represents a visual depiction of data stored in an associated database and accessible via a web-site. From FIG. 14, a client or service provider is able to view a listing of devices 500, locations, date placed in operation and the like. The skilled artisan will appreciate that other suitable data fields other than those shown are capable of being stored and displayed and the present invention is not limited to those fields illustrated in FIG. 14. The spreadsheet 1400 is suitably selected via the device database tab 1402, as shown. In addition, the skilled artisan will appreciate that the viewer is able to select other displays by selecting the event history tab 1404, the service log tab 1406, and the tracking log tab 1408. With respect to the spreadsheet 1400, various data fields are shown, including a device ID field 1410, a transmitting code ID 1412, a telephone number 1414, an asset ID 1416, a client number 1418, the installation type 1420, the date provisioned 1422, the SIM number 1424, the date installed 1426, and the location 1428 in which the device 500 was installed. As will be understood by those skilled in the art, the viewer is able to search the database displayed on the spreadsheet 1400 via the device ID 1410, the transmitting code ID 1412, the telephone number 1414, or the asset ID 1416 associated with the device 500 being queried.

Figure 15:
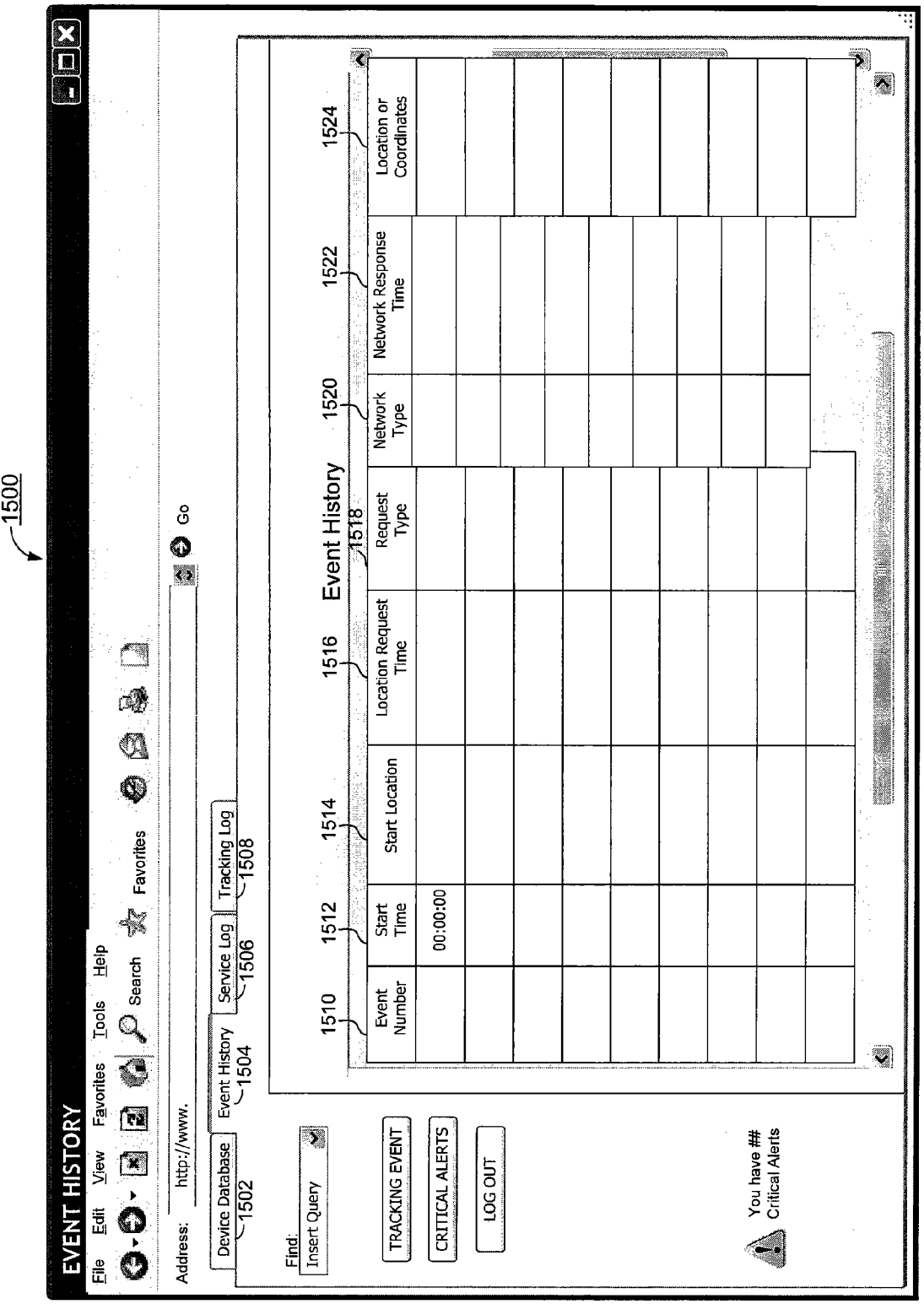
FIG. 15 is a template illustrative of an event history screen in accordance with the present invention.

Referring to FIG. 15, there is shown a template screenshot illustrating an event history spreadsheet 1500 corresponding to a specific client, or to a specific service provider. As will be appreciated by those skilled in the art when viewing the spreadsheet shown in FIG. 15, a viewer is able to view a historical listing of an event, from initiation of the tracking to final location of the asset. As shown by the template of FIG. 15, a viewer has selected the event history tab 1504 in order to view the event history associated with a device 500. The viewer is capable of selecting other views of data stored in the database by selecting the device database tab 1502, the service log tab 1506 and the tracking log tab 1508. The event history spreadsheet 1500 suitably displays a variety of data fields representing data stored in the database. As shown, the spreadsheet 1500 includes an event number 1510, a start time 1512, a start location 1514, a location request time 1516, a request type 1518, a network type 1520, a network response time 1522 and the location/coordinates 1524 of the device 500. A viewer is suitably capable of searching the database for a selected event and viewing the information corresponding to that selected event in spreadsheet 1500.

Figure 16:
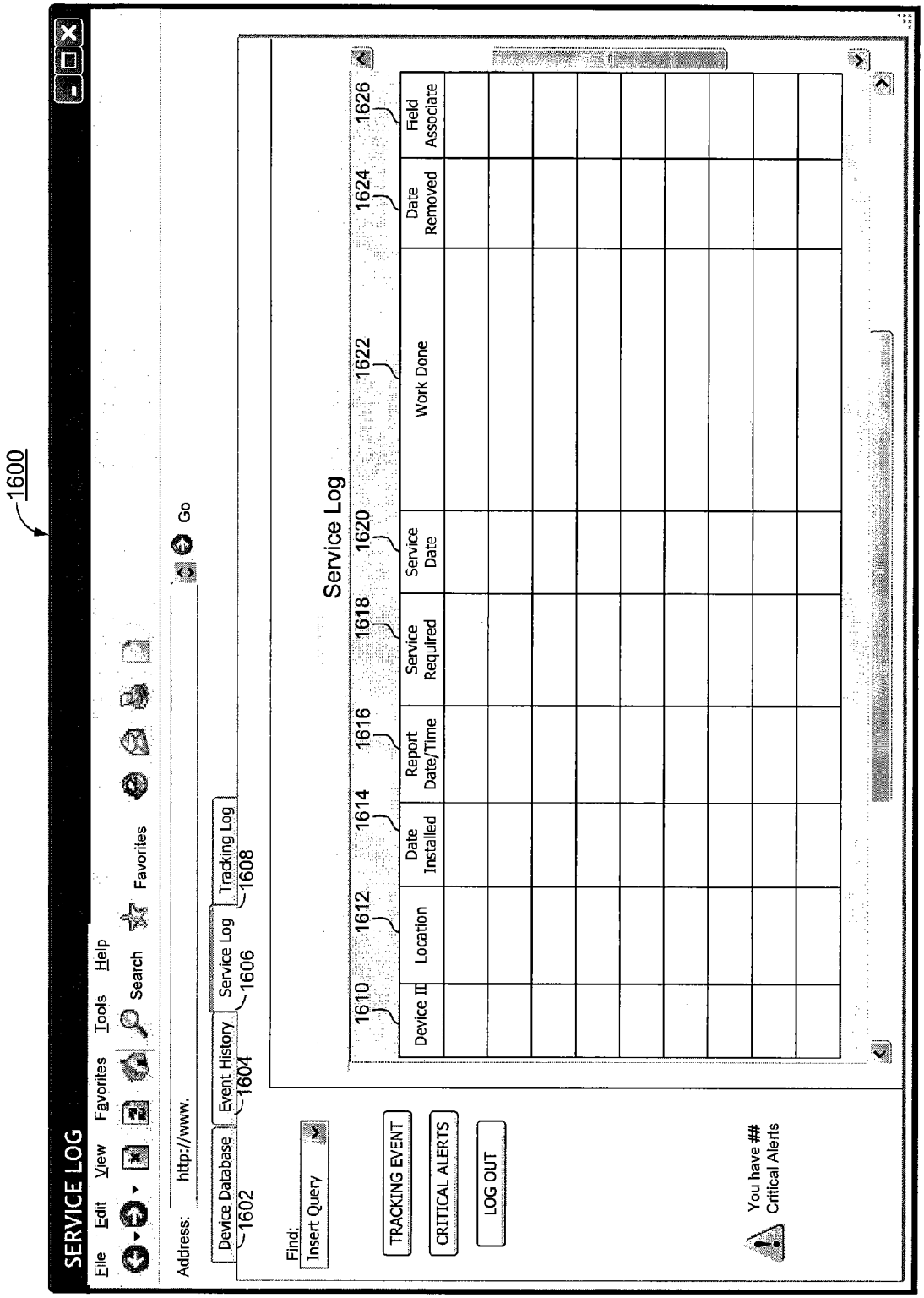
FIG. 16 is a template illustrative of a service log screen in accordance with the present invention.

FIG. 16 illustrates a template screenshot showing a service log 1600 regarding each device 500 in use. As will be understood from FIG. 16, a viewer selects the service log tab 1606 to display log data in the service log spreadsheet 1600. A viewer is capable of selecting various database screens by selecting the device database tab 1602, the event history tab 1604, and the tracking log tab 1608. As shown in the service log spreadsheet 1600, various data fields are displayed to the viewer incorporating data from the database regarding a selected device 500. The service log 1600 suitably includes a device ID 1610, a location 1612 where the device 500 was installed, a date the device 500 was installed 1614, the date/time of a report 1616 regarding the device 500 was generated, the type of service 1618 required, the date 1620 the service was performed on the device 500, a description 1622 of the service performed on the device 500, the date 1624 the device 500 was removed, and the field associate 1626 performing the service on the device 500. Various other types of information are stored in the database and are capable of being displayed to the viewer in addition to those fields shown in FIG. 16 and the present invention is not limited to those fields listed above.

Figure 17:
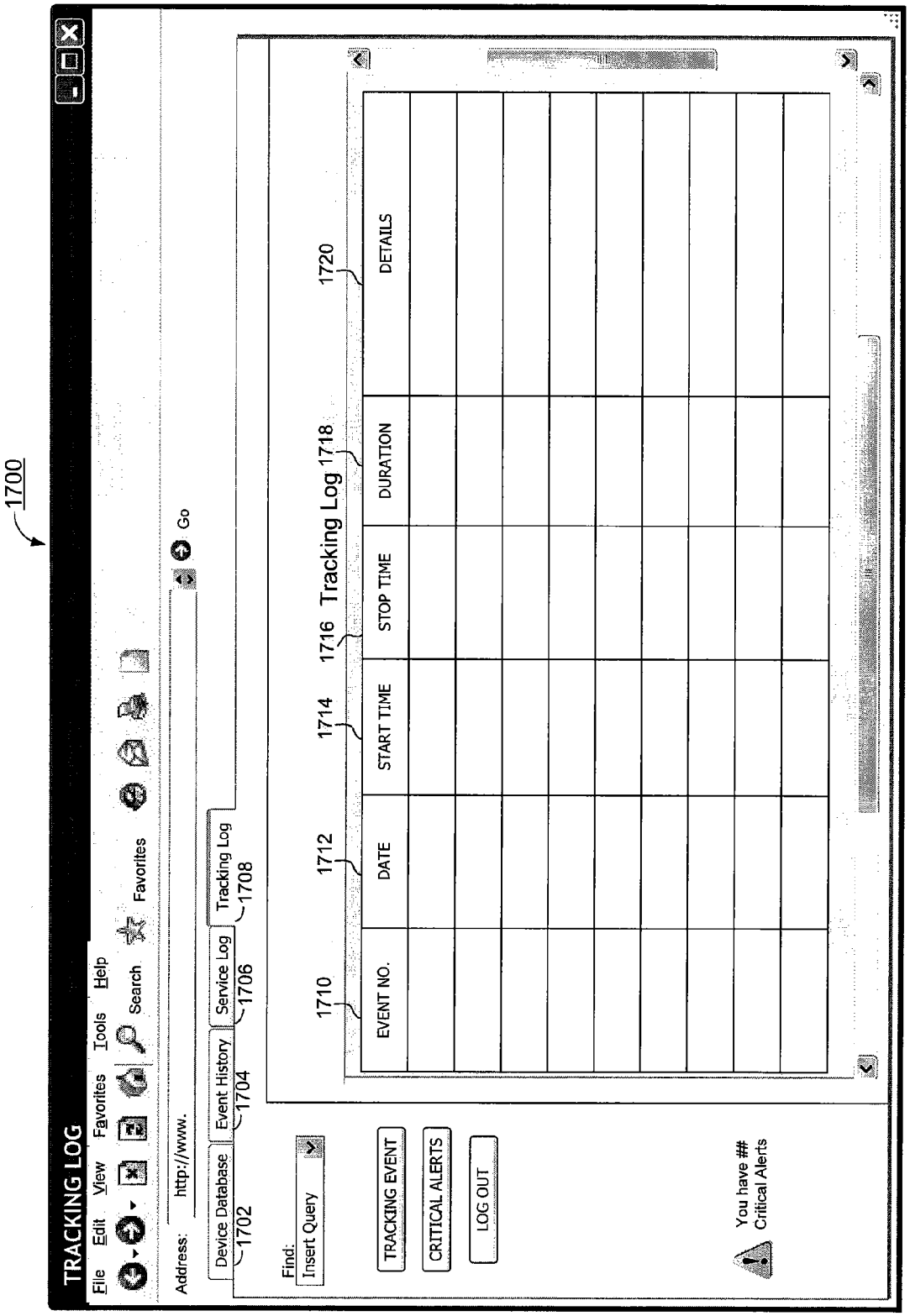
FIG. 17 is a template illustrative of a tracking log screen in accordance with the present invention.

As illustrated in FIG. 17, there is shown a spreadsheet illustrating a tracking event log 1700 corresponding to a specific device 500. Upon the viewer's selection of the tracking log tab 1708, the tracking event log spreadsheet 1700 is suitably displayed. The skilled artisan will appreciate that other views of data stored in the database are able to be selected via tabs 1702, 1704 and 1706. The tracking event log spreadsheet 1700 advantageously displays tracking events associated with a device 500. As shown in FIG. 17, the spreadsheet 1700 includes various data fields displaying tracking information stored in the database to the user. As illustrated by FIG. 17, the fields include an event number 1710, a date 1712 associated with the event, a time 1714 when the event started, a time 1716 when the event stopped, i.e., ended, the duration 1718 of the tracking event, and suitable details 1720 associated with the device 500, the event, or both.

The skilled artisan will appreciate that FIGS. 14-17 are illustrated as viewable via a web-browser and in spreadsheet format, however any means of displaying and viewing the data are equally capable of being employed without departing from the scope of the present invention.

Figure 18:
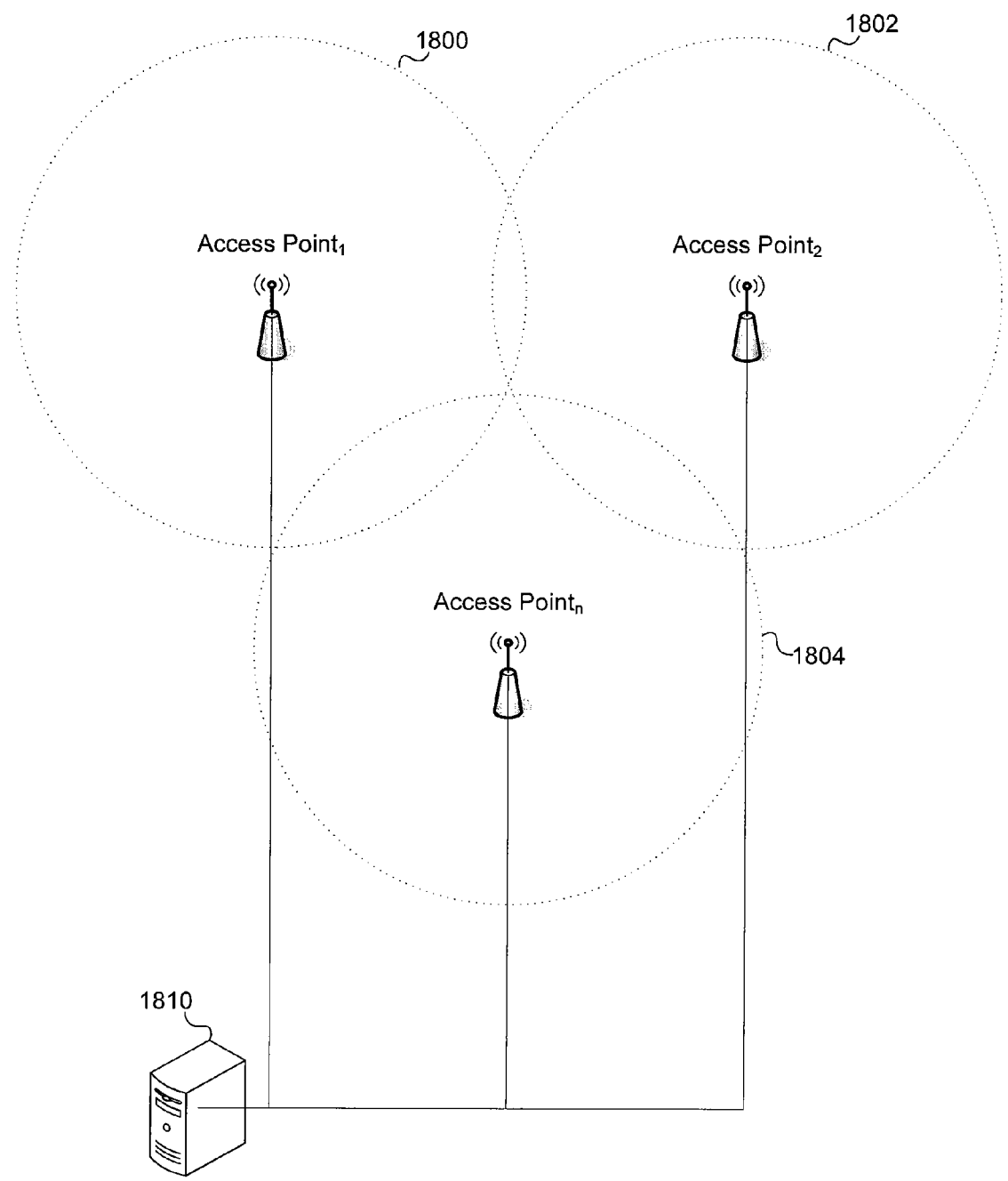
FIG. 18 illustrates an embodiment in which a wireless network, such as a WiFi or WiMax network provides cell based asset tracking.

As noted above, the subject invention is suitably realized in a cellular environment. Cellular telephony and cellular networking, such as WiFi and WiMax commonly access points that typically defined overlapping regions. FIG. 18 is provided to illustrate an environment specific to a current 802.11× setup. In the illustration, a series of 1, 2, . . . , n wireless access points (AP) cover respective areas 1800, 1802 and 1804, which overlap to form continuous, or near continues coverage over a larger area.

The environment of FIG. 18 is configured as a wireless local area network (WLAN) such as a 802.11 standard network. The wireless network comprises access points (AP) 1800, 1802, and 1804 having known locations. Access points 1800, 1802, and 1804 are connected by a backbone network (not shown) to an Authentication, Accounting, and Authorization (AAA) server 1810, for example a Remote Authentication Dial-In User Service (RADIUS) server. The backbone network is any suitable wireless or wired topology. A device transmitter (not shown) is configured as a mobile unit to operate on the network. When the device transmitter (not shown) is activated, it establishes a session with a nearby access point, for example, in FIG. 18, the access point is suitably 1804. When the device transmitter (not shown) establishes a session with an access point (e.g. AP 1804), the access point authenticates the device transmitter (not shown) with Authentication, Accounting, and Authorization server 1810. Thus, because the Authentication, Accounting, and Authorization server 1810 knows the identity of the access point with which mobile unit (not shown) is associated, the location of the device transmitter (not shown) is determined.

Newer wireless networks, such as wireless networks compliant with the I.E.E.E. 802.11i standard, also provide the capability for mobile units (not shown) to preauthenticate with access points on the network that they are receiving beacons from. For example, as shown in FIG. 18, a device transmitter (not shown) receives beacons from the access point 1804. A device transmitter (not shown) preauthenticates with an access point 1804 by sending a message to the access point it is currently associated with, access point 1802 in this example, which forwards the preauthentication request to Authentication, Accounting, and Authorization server 1810. The preauthentication requests received by Authentication, Accounting, and Authorization server 1810 enable more precise location determination by as well as speed determination. Thus, it is appreciated that such wireless networking protocols are analogous to cellular telephony, as described herein.

The embodiments above allow for a non-governmental entity, in the form of a service provider, to provide security for a customer. That is, the service provider is able to provide a customer with the whereabouts of the customer's designated objects at any time. In the event the designated object has been purloined, the service provider is even able to direct the police to the location of the missing object, using nothing more than the existing cellular telephone network infrastructure.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. An asset tracking system comprising:
    means adapted for receiving device data representative of at least one property of each of a plurality of portable asset tracking devices, the at least one property including device identification data;
    means adapted for identifying at least one client corresponding to received identification data;
    alert means adapted for generating alert data corresponding to a triggering of a tracking event in connection with at least one portable asset tracking device of the plurality of portable asset tracking devices;
    means adapted for isolating event data corresponding to at least one tracking event corresponding to operation of the alert means;
    means adapted for receiving, on at least one mobile tracking system, a signal from the at least one portable asset tracking device;
    means adapted for communicating first location data of the at least one mobile tracking system in accordance with a position associated therewith relative to the signal received from the at least one portable asset tracking device;
    location means adapted for generating second location data corresponding to a location of the at least one portable asset tracking device in accordance with the mobile tracking system first location data and at least two tracking systems, the at least two tracking systems including a cellular communication system;
    means adapted for receiving intercept data generated in accordance with the first location data of the at least one mobile tracking system and the second location data corresponding to the location of the at least one portable asset tracking device, the intercept data being representative of an optimal route to the at least one portable asset tracking device by the at least one mobile tracking system;
    means adapted for communicating the intercept data to the at least one mobile tracking device;
    means adapted for receiving device service data corresponding to an operational history of the at least one portable asset tracking device via the cellular communication system;
    means adapted for receiving temporal data representative of at least one temporal property of the tracking event; and
    means adapted for generating display data in accordance with device data, event data, location data, device service data, and temporal data after generation of the alert data by the alert means.

2. The asset tracking system of claim 1 wherein the location means includes means adapted for providing temporally displaced updates to the second location data generated.

3. The asset tracking system of claim 2 wherein the location means includes means for generating the second location data with at least one of GPS data and cellular phone data relating to the at least one tracking device.

4. The asset tracking system of claim 3 further comprising:
    means adapted for acquiring cartographical data from an associated data storage; and
    means adapted for generating a composite map display data in accordance with the second location data and the cartographical data.

5. The asset tracking system of claim 4 further comprising:
    database means adapted for storing of device identification data, event data, location data, device service data, and temporal data associated with the at least one tracking event;
    means adapted for receiving query data corresponding to a selected query of the database; and
    means adapted for generating query response data in accordance with application of received query data to the database means.

6. The asset tracking system of claim 4 further comprising thin client display generator means adapted for generating the display data, composite map display data, and query response data in a format so as to be displayable on an associated web browser.

7. An asset tracking method comprising the steps of:
    receiving device data representative of at least one property of each of a plurality of portable asset tracking devices, the at least one property including device identification data;
    identifying at least one client corresponding to received identification data;
    generating alert data corresponding to a triggering of a tracking event in connection with at least one portable asset tracking device of the plurality of portable asset tracking devices;
    isolating event data corresponding to at least one tracking event corresponding to the generation of alert data;
    receiving, on at least one mobile tracking system, a signal from the at least one portable asset tracking device;
    communicating first location data of the at least one mobile tracking system in accordance with a position associated therewith relative to the signal received from the at least one portable asset tracking device;
    generating second location data corresponding to a location of the at least one portable asset tracking device in accordance with the mobile tracking system first location data and at least two tracking systems, the at least two tracking systems including a cellular communication system;
    receiving intercept data generated in accordance with the first location data of the at least one mobile tracking system and the second location data corresponding to the location of the at least one portable asset tracking device, the intercept data being representative of an optimal route to the at least one portable asset tracking device by the at least one mobile tracking system;
    communicating the intercept data to the at least one mobile tracking device;

receiving device service data corresponding to an operational history of the at least one portable asset tracking device via the cellular communication system;

receiving temporal data representative of at least one temporal property of the tracking event; and generating display data in accordance with device data, event data, location data, device service data, and temporal data after generation of the alert data.

8. The asset tracking method of claim 7 wherein the step of generating location data includes providing temporally displaced updates to the second location data generated.

9. The asset tracking method of claim 8 wherein the step of generating location data includes generating the second location data with at least one of GPS data and cellular phone data relating to the at least one tracking device.

10. The asset tracking method of claim 9 further comprising the steps:

acquiring cartographical data from an associated data storage; and generating a composite map display data in accordance with the second location data and the cartographical data.

11. The asset tracking method of claim 10 further comprising the steps of:

storing of device identification data, event data, location data, device service data, and temporal data associated with the at least one tracking event;

receiving query data corresponding to a selected query of the database; and generating query response data in accordance with application of received query data to the database.

12. The asset tracking method of claim 10 further comprising the step of generating the display data, composite map display data, and query response data in a format so as to be displayable on an associated web browser.

* * * * *